US007899799B2

(12) United States Patent
Furuya

(10) Patent No.: US 7,899,799 B2
(45) Date of Patent: Mar. 1, 2011

(54) TRANSACTION PROCESSING SYSTEM OF DATABASE USING MULTI-OPERATION PROCESSING PROVIDING CONCURRENCY CONTROL OF TRANSACTIONS

(76) Inventor: Toru Furuya, Yamaguchi (JP)

( * ) Notice: Subject to any disclaimer, the term of this patent is extended or adjusted under 35 U.S.C. 154(b) by 188 days.

(21) Appl. No.: 12/453,188

(22) Filed: May 1, 2009

(65) Prior Publication Data

US 2009/0287703 A1    Nov. 19, 2009

(30) Foreign Application Priority Data

May 2, 2008    (JP) .................... 2008-120540

(51) Int. Cl.
*G06F 7/00* (2006.01)
(52) U.S. Cl. .......................... 707/703; 707/798
(58) Field of Classification Search .................. None
See application file for complete search history.

(56) References Cited

U.S. PATENT DOCUMENTS

| 5,280,619 | A | | 1/1994 | Wang | |
|---|---|---|---|---|---|
| 5,701,480 | A | * | 12/1997 | Raz | 718/101 |
| 5,983,225 | A | * | 11/1999 | Anfindsen | 1/1 |
| 6,078,982 | A | * | 6/2000 | Du et al. | 710/200 |
| 6,272,515 | B1 | * | 8/2001 | Fouquet | 718/101 |
| 2004/0068501 | A1 | * | 4/2004 | McGoveran | 707/8 |
| 2005/0216789 | A1 | * | 9/2005 | Haagens et al. | 714/12 |
| 2008/0120300 | A1 | * | 5/2008 | Detlefs et al. | 707/8 |
| 2008/0294615 | A1 | | 11/2008 | Furuya et al. | |

FOREIGN PATENT DOCUMENTS

| JP | 07-084864 A | 3/1995 |
|---|---|---|
| JP | 07-200372 A | 8/1995 |
| JP | 10-320258 A | 12/1998 |
| JP | 2000-163294 A | 6/2000 |
| JP | 2002-32249 A | 1/2002 |
| JP | 2004-234567 A | 8/2004 |
| JP | 4071816 B1 | 1/2008 |
| JP | 4073033 B1 | 2/2008 |
| JP | 4109305 B1 | 4/2008 |
| JP | 4261609 B1 | 2/2009 |

OTHER PUBLICATIONS

"Concurrency Control in Real-Time Databases by Dynamic Adjustment of Serialization Order," by Lin and Son. IN: Real-Time Systems Symposium, 1990. Proceedings., 11th. Available at: IEEE Xplore.*
"Database Concurrency Control Using Data Flow Graphs," by Eich and Wells. IN: ACM Transactions on Database Systems, vol. 13, No. 2 (1988), pp. 197-227. Available at: ACM.*
Office Action of Japanese Patent Application No. 2008-120540 mailed on Sep. 30, 2008 (Japan).

(Continued)

*Primary Examiner* — Neveen Abel-Jalil
*Assistant Examiner* — Daniel Kinsaul
(74) *Attorney, Agent, or Firm* — Rader, Fishman & Grauer PLLC

(57) ABSTRACT

Instead of executing a plurality of submitted transactions separately, each data item to be processed by the plurality of submitted transactions is retrieved only once, update operations of the plurality of transactions are executed consecutively on the retrieved data item in main memory, and only the last updated result is written in a database once.
Two-phase locking technique and timestamp technique are used for multi-operation processing providing concurrency control of transactions in order to execute multiple synthetic transactions concurrently.

4 Claims, 13 Drawing Sheets

OTHER PUBLICATIONS

Hiroyuki Kitagawa, "Transaction", Database Systems, Text book Series No. 14, pp. 146-173, Shokodo (Jul. 1996).

Ramez Elmasri et al., "Fundamentals of Database System", pp. 527-574, Addison-Wesley Publishing Company (1994).

Kazumi Kanehiro, "IT Engineer's Basic, Database Technology, Knowledge and Business of Database", Shoeisha, pp. 88-105 (Dec. 2007).

JPO Office Action mailed Sep. 30, 2008.

* cited by examiner

```
                                    write_lock(E.r21);              TIME
                                    write_lock(D.r13);
                                    write_lock(D.r14);
                                    write_lock(D.r15);
                                    write_lock(D.r19);
                                    read_item(E.r21);
                                    E.r21.DNUM := 4;
                                    write_item(E.r21);
                                    read_item(D.r13);
                                    D.r13.MGRSSN := 1876767888;
                                    write_item(D.r13);
                                    read_item(D.r14);
                                    D.r14.MGRSSN := 1876767888;
                                    D.r14.DPHONE := 25-3945
                                    write_item(D.r14);
                                    read_item(D.r15);
                                    D.r15.DNAME := 'COMMUNICATION';
                                    write_item(D.r15);
                                    commit(T11);
                                    unlock(P.r9);
                                    unlock(P.r18);
                                    unlock(E.r11);
                                    unlock(E.r21);
                                    unlock(D.r13);
                                    unlock(D.r14);
  read_item(D.r3);                  unlock(D.r15);
  D.r3.BUDGET := D.r3.BUDGET - 15000;
  D.r3.DPHONE := 23-3736;
  write_item(D.r3);
  unlock(D.r3);
  read_item(D.r22);
  D.r22.MGRSSN := 433434659;
  write_item(D.r22)
  read_item(D.r23);
  unlock(D.r22);
  unlock(D.r23);

read_item(E.r6);
  E.r6.BDATE := 'DEC-27-1971';
  E.r6.DNUM := 7;                   read_item(D.r19);
  write_item(E.r6);                 D.r19.BUDGET := D.r19.BUDGET * 2;
  commit(T7);                       write_item(D.r19);
  unlock(E.r6);                     commit(T10);
  read_item(E.r14);                 unlock(D.r19);
  E.r14.DNUM := 4;
  write_item(E.r14);
  commit(T1);
  commit(T5);
  unlock(E.r14);
  read_item(E.r10);
  E.r10.DNUM := 7;
  E.r10.BDATE := 'DEC-27-1971';
  write_item(E.r10);
  commit(T8);                            FIG. 5-2
  commit(T4);
  commit(T6);
  unlock(E.r10);
```

(a)

(b)

(c)  (d)  (e)

(a)
NUMBER OF TRANSACTIONS AND PROCESSING SPEED (SECONDS)

| NUMBER OF TRANSACTIONS | 1000 | 2000 | 3000 | 4000 | 5000 | 6000 | 7000 | 8000 | 9000 | 10000 |
|---|---|---|---|---|---|---|---|---|---|---|
| CONVENTIONAL TWO-PHASE LOCKING PROTOCOL | 47.03 | 86.45 | 126.89 | 161.58 | 198.78 | 226.91 | 282.13 | 304.80 | 364.20 | 439.50 |
| MULTI-OPERATION PROCESSING PROVIDING CONCURRENCY CONTROL OF TRANSACTIONS | 3.38 | 4.73 | 6.31 | 8.28 | 9.94 | 12.61 | 14.11 | 16.03 | 17.75 | 19.66 |

(b)

NUMBER OF TRANSACTIONS AND PROCESSING SPEED (SECONDS)

TRANSACTION PROCESSING SYSTEM OF DATABASE USING MULTI-OPERATION PROCESSING PROVIDING CONCURRENCY CONTROL OF TRANSACTIONS

FIELD OF INVENTION

The present invention is related to transaction processing system of database and especially related to concurrency control of transactions where multiple transactions are executed concurrently for the same access areas.

RELATED APPLICATIONS

Japanese Patent Application No. 2006-356406
Japanese Patent Application No. 2007-075670
Japanese Patent Application No. 2008-120540
U.S. patent application Ser. No. 12/149,059

BACKGROUND OF THE INVENTION

A database management system concurrently executes a large number of transactions submitted from multiple users through a network. However, if multiple transactions are executed on the same data items concurrently, data inconsistency may occur. Therefore, in order to avoid any data consistency to occur, the database management system uses concurrency control to execute multiple transactions.

<Serializable Schedule>

In order to execute multiple transactions without causing any data inconsistency, the easiest method is to execute each transaction one by one. This method is called serial scheduling, in which execution of a subsequent transaction cannot be started until the execution of a current transaction is completed.

The problem of serial scheduling is that it limits concurrency or interleaving of operations. In a serial schedule, if a transaction waits for an I/O operation to complete, the CPU processor cannot be switched to another transaction, thus wasting valuable CPU processing time and making serial schedule generally unacceptable.

Thus, in order to execute multiple transactions concurrently without causing any data inconsistency, serializable scheduling is used.

In order to achieve a serializable schedule, a locking method is used for data items to be processed by multiple transactions. There are several types of locks such as shared lock and exclusive lock. A shared lock is a read lock which is used by a transaction to only read a data item; thus if one transaction is using a shared lock to read a data item, other transactions can read the data item but cannot update or delete the data item until the shared lock is released from the data item. An exclusive lock is a write lock which is used by a transaction to read and write a data item; thus, if one transaction is using an exclusive lock to update a data item, other transactions cannot read, delete, or update the data item until the exclusive lock is released from the data item.

However, only using locks may cause a data inconsistency between multiple transactions depending on some locking orders. Therefore, if multiple transactions need to lock the same data items, a method of creating a dependency graph representing the locking order for the transactions is used. If there is a cycle in the dependency graph, this means that there is a data inconsistency between some of these transactions; therefore, all of the transactions in the dependency graph are aborted, and the aborted transactions are then restarted from the beginning. If there is no cycle in the dependency graph, all of the transactions are executed correctly without causing any data inconsistency.

However, each time a cycle appears in the dependency graph, transactions are aborted repeatedly and thus this method is inefficient. Moreover, the serializable schedule may not be available even if the transactions are restarted many times. Therefore, there are protocols that guarantees serializable schedule such as two-phase locking protocol, optimistic locking protocol, timestamp protocol, multi-version protocol, etc.

(1) Two-Phase Locking Protocol

The two-phase locking protocol divides lock operations into two phases: a growing phase, during which acquiring of new locks on data items is allowed but none can be released; and a shrinking phase, during which existing locks can be released but no new locks can be acquired; thus, acquiring a lock again after releasing a lock is not allowed.

Also during the growing phase, upgrading of locks is allowed in addition to acquiring locks, and during the shrinking phase, downgrading of the lock is allowed in addition to releasing locks.

In order to ensure a serializable schedule, all transactions in a schedule need to be executed with the two-phase locking protocol.

However, in the two-phase locking protocol, if multiple transactions hold the locks required by each other and any of their operations cannot be performed, a deadlock occurs. In order to remove the deadlock, one of transactions holding its locks needs to be aborted, rolled back, and resubmitted to the transaction processing system.

In addition, if other transactions read the value of the data item written by the aborted transaction, these transactions are also aborted, rolled back, and resubmitted to the transaction processing system. The effect of aborting a transaction causes another transactions to abort in a chain reaction is called cascading rollback.

In order to avoid cascading rollback, a strict two-phase locking protocol can be used. This method has an additional condition that a transaction does not release its first lock in the shrinking phase until the transaction is committed or aborted.

While this method prevents cascading rollback, the time of holding locks by each transaction becomes longer.

<Problem of Two-Phase Locking>

In the two-phase locking protocol, if the number of transactions to be executed concurrently increases, a lock contention may occur between multiple transactions, and thereby a deadlock can easily occur. As a result, many transactions are aborted and rolled back to remove the deadlock, thus causing transaction processing speed to decrease.

In the two-phase locking protocol, if multiple transactions are performed on the same data item, the same data item is locked by each transaction repeatedly so that while one transaction is holding a lock on the data item, other transactions must wait until that lock is released.

The two-phase locking protocol uses an operating system process to execute each transaction. However, if the operation system switches processes while one transaction is holding a lock on a data item, the other transaction requiring to process the data item cannot acquire a lock to the data item even if it has received processing time from a CPU (microprocessor); then, if the operating system switches the processes again, the other transaction is not able to perform any operation. Therefore, if the number of transactions to be executed concurrently increases, this situation occurs repeatedly, slowing down the transaction processing speed significantly.

(2) Optimistic Locking Protocol

The optimistic locking protocol executes each transaction by assuming that there is no contention in executing the transaction, and then checks for any contention when the transaction ends. If there is contention, it aborts and rollbacks the transaction. If there is no contention, it locks the data items to be written, performs the write operations, and commits the transaction. Since this method does not hold any locks while processing a transaction, the time for acquiring locks is only a short period just before committing the transaction.

<Problem of Optimistic Locking Protocol>

Similar to the problem of the two-phase locking protocol, there are problems in the optimistic locking protocol such as, if the number of transactions to be executed concurrently increases, the number of transactions that compete to update data items increases so that the number of transactions that abort and rollback also increases.

(3) Timestamp Protocol

In order to execute multiple transactions concurrently, the timestamp protocol assigns a timestamp (arrival time) to each transaction and executes the multiple transactions in the order from the transaction of smaller timestamp (early arrival time) to transaction of larger timestamp (late arrival time).

Each data item to be processed by a transaction is also given a read timestamp and a write timestamp; then the transactions are executed based on the following rules.

When a transaction performs a read operation on a data item, the timestamp of the transaction and the write timestamp of the data item are compared. If the timestamp of the transaction is smaller, the transaction is aborted because the value of the data item to be read by the transaction is already lost. Otherwise, the transaction is executed and the read timestamp of the data item is set to the timestamp of the transaction.

When a transaction performs a write operation on a data item, the timestamp of the transaction and the read timestamp of the data item are compared. If the timestamp of the transaction is smaller, the transaction is aborted because another transaction, which supposed to read the data item after being written by the first transaction, read that data item first.

Moreover, if the timestamp of the transaction is larger than the read timestamp of the data item and smaller than the write timestamp of the data item, the transaction is aborted because the transaction has missed the time to perform its write operation. Otherwise, the transaction is executed and the write timestamp of the data item is set to the timestamp of the transaction if the timestamp of the transaction is larger than the write timestamp of the data item.

The aborted transactions mentioned above are rolled back, resubmitted to the transaction processing system, and then given new timestamps.

Timestamp protocol can use the technique called Thomas's write rule to reduce the number of transactions to be aborted.

With this technique, when a transaction performs a write operation on a data item, if the timestamp of the transaction is greater than the read timestamp of the data item and smaller than the write timestamp of the data item, the transaction has missed the time to perform its write operation; however, if the database and other transactions are not affected, the transaction ignores the write operation and continues its execution.

<Problem of Timestamp Protocol>

Since the timestamp protocol does not use locks, a deadlock does not occur. However, if the number of transactions to be executed concurrently increases, the multiple transactions may not be executed for a data item in the right order, thus causing many transactions to be aborted, rolled back, and resubmitted to the transaction processing system. If such operation occurs repeatedly, a problem such as transactions never completing occurs.

(4) Multi-Version Technique

The multi-version technique is a method that keeps track of multiple values of a single data item by storing the previous value of the data item when a transaction writes the data item. Then, when multiple transactions are each executed on the same data item, the appropriate version of the data item is selected for each transaction to reduce the number of transactions to be aborted. There is a multi-version technique applying the two-phase locking protocol as well as the timestamp protocol.

<Problem of Multi-Version Technique>

The problem of the multi-version technique is that additional storage space is required for storing multiple values for each data item.

[Patent Document 1]
Japanese Unexamined Patent Application Publication No. Hei 07-084864
[Patent Document 2]
Japanese Unexamined Patent Application Publication No. Hei 07-200372
[Patent Document 3]
Japanese Unexamined Patent Application Publication No. Hei 10-320258
[Patent Document 4]
Japanese Unexamined Patent Application Publication No. 2002-32249
[Patent Document 5]
U.S. Pat. No. 5,280,619 Jan. 18, 1994
System for accessing shared data using a serialization graph constructed from a history file showing completed locking dependencies between transactions
[Non-Patent Document 1]
Hiroyuki Kitagawa, Database System, pp. 147-173, Textbook of Information System Series Volume 14, SHOKODO CO., LTD., First Print Published in Jul. 10, 1996
[Non-Patent Document 2]
Ramez Elmasri, Shamkant B. Navathe, Fundamentals of Database Systems Second Edition, pp. 527-575, Addison-Wesley Publishing Company, 1994
[Non-Patent Document 3]
Kazuimi Kanehiro, Knowledge and Practice of Database Carefully Taught By an Expert, pp. 88-105, SHOEISHA. CO., LTD., 2007

BRIEF EXPLANATION OF THE DRAWINGS

FIG. 2-1 is a diagram showing a flowchart of the transaction processing system.

FIG. 2-2 is a diagram showing a flowchart of the transaction processing system.

FIG. 3-1 is a diagram showing an exemplary database relation.

FIG. 3-2 is a diagram showing an exemplary database relation.

FIG. 5-1 is a diagram showing an example of multi-operation processing using two-phase locking.

FIG. 5-2 is a diagram showing an example of multi-operation processing using two-phase locking.

DESCRIPTION OF THE INVENTION

Figure 1:
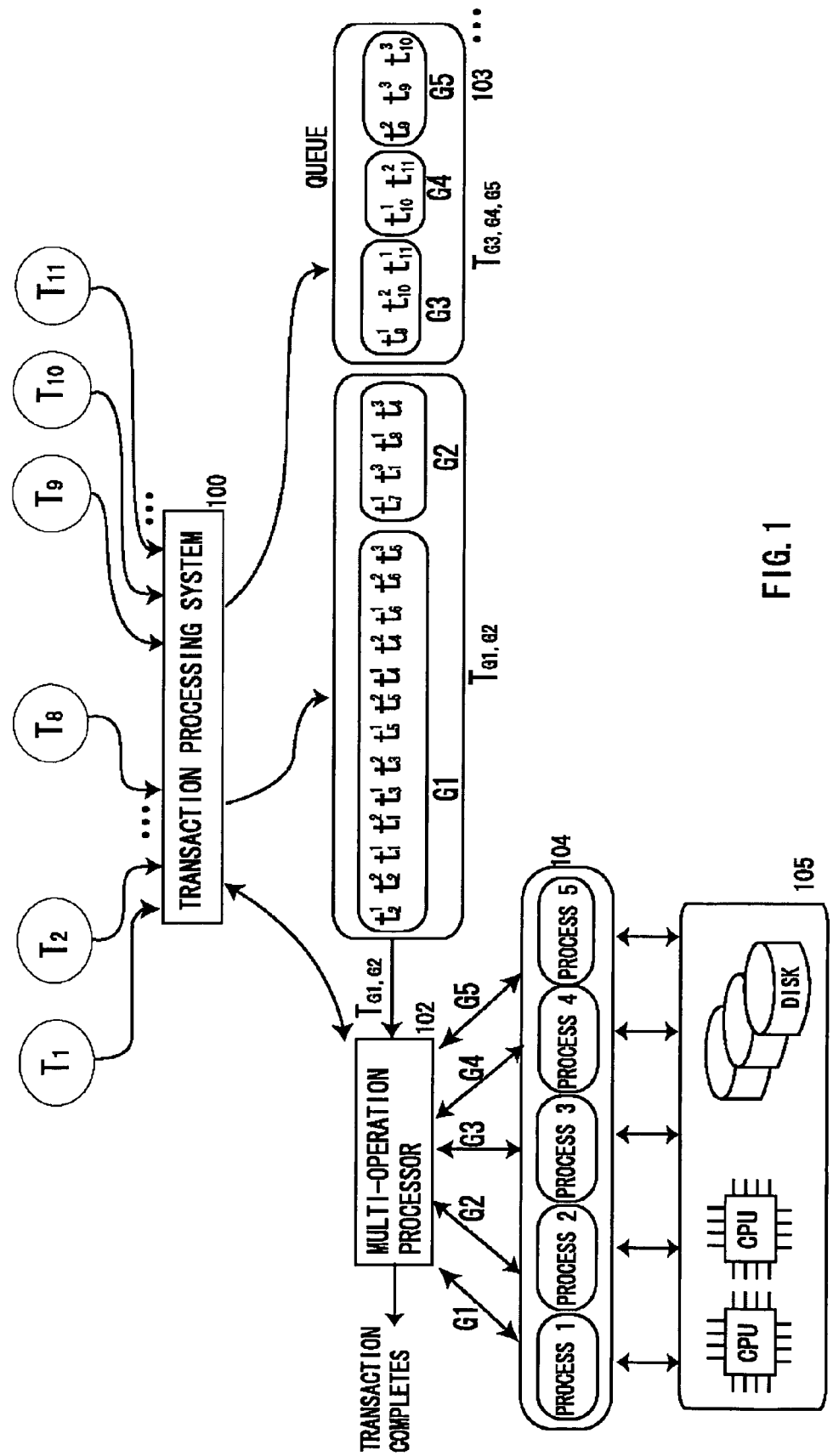
FIG. 1 is a diagram showing the architecture of a transaction processing system.

Problem to be Solved by the Invention

The conventional transaction processing system is not an efficient method as it has the above mentioned problems. Since the conventional method executes each transaction separately, if the number of transactions to be executed concurrently increases, the same data item is read and written by each transaction repeatedly, thus causing many transactions to compete so that the number of transactions that abort and rollback also increases. Therefore, the transaction processing speed is decreased.

With the present invention, instead of executing multiple transactions separately, each data item to be processed by the multiple transactions is retrieved only once, the update operations of the multiple transactions are executed consecutively on the retrieved data item in main memory, and only the last updated result is written in a database once.

Means of Solving the Problem

In order to achieve the above mentioned purpose, we propose a transaction processing system of database using multi-operation processing providing concurrency control of transactions. The transaction processing system includes transaction execution order determination means for determining a transaction execution order for a plurality of submitted transactions; precedence graph creating means for creating a precedence graph indicating to update data in the determined transaction execution order when a plurality of transactions performs its operation on the same data item by creating an edge for the data item and drawing it from the vertex of the first transaction to perform its operation to vertex of the next transaction to perform its operation; task retrieval means for retrieving partial operations contained in the plurality of transactions as tasks; grouping means for grouping the retrieved tasks into groups for each access area of the database in the transaction execution order; synthetic transaction creating means for creating a synthetic transaction using the groups created by grouping; and multi-operation processing means for executing each group contained in the synthetic transaction using multi-operation processing, wherein the multi-operation processing means finds blocks in the access area to be accessed by the grouped tasks, determines an access order for the blocks in the lined up order of the tasks in the group, reads a block in the determined access order, extracts tasks accessing the read block from the group, executes the task operations consecutively on a data item in the block in the lined up order of the tasks in the group, determines whether an ended transaction can be committed based on whether an incoming edge to the vertex of the ended transaction in the precedence graph exists at this time when execution of a grouped task is finished and the transaction containing the finished task is ended, commits the transaction if the vertex of the ended transaction does not have any incoming edges, and removes the vertex of the transaction and all of the outgoing edges from the vertex; a process of executing the task operations consecutively on a data item in the block in the lined up order of the tasks in the group means executing the task operations, which are partial operations of the transactions, consecutively on the data item according to the transaction execution order indicated in the precedence graph if the data item in the block exists in the precedence graph, that is, when the plurality of tasks performs its update operation on the data item, the update operation of the first task is executed on the data item, the update operation of the next task is executed on the updated data item, such update operation is repeated in this manner, and only the last updated result is written in the database once after the update operation of the last task is executed.

Also, two-phase locking protocol or timestamp protocol is used to execute multiple synthetic transactions concurrently.

A program corresponding to respective functions of the above transaction processing system of database, which is executed by a computer system, and a storage medium stored with this program are also aspects of the present invention.

Result of the Invention

By using the present invention: multi-operation processing providing concurrency control of transactions, unlike the conventional transaction processing, retrieving the same data item many times repeatedly, executing an update operation on the retrieved data item separately, and writing the updated result in a database many times repeatedly are no longer required for each transaction in executing multiple submitted transactions.

With the system of the present invention, the data item to be processed by multiple transactions is retrieved only once, the update operations of the multiple transactions are executed consecutively on the retrieved data item in the main memory, and only the last updated result is written in the database once; thereby improving the transaction processing speed.

Furthermore, because multi-operation processing is used, the block storing the data items to be processed by multiple transactions is required to be read only once from a disk.

Since the system of the present invention creates a single synthetic transaction for multiple submitted transactions and each group contained in the synthetic transaction is executed for a different relation, even if the multiple groups contained in the synthetic transaction are executed concurrently, the same data items are not accessed simultaneously by the multiple groups. Also, tasks collected into a group are executed consecutively for a data item in the block read into the main memory according to the transaction execution order indicated in the precedence graph. As a result, no locks are required between the multiple transactions synthesized in the synthetic transaction, and making transactions wait and aborting transactions are no longer required.

The system of the present invention creates a single synthetic transaction for multiple submitted transactions and executes the synthetic transaction. After the synthetic transaction is executed, if new multiple transactions are submitted, the system creates another synthetic transaction for the newly arrived transactions and executes that synthetic transaction. Therefore, as long as synthetic transactions are executed serially, no locks are required, deadlocks do not occur, and the multiple groups contained in each synthetic transaction are executed concurrently.

The processing speed of executing multiple transactions can be improved significantly by executing synthetic transactions serially; however, when concurrent execution of multiple synthetic transactions is required, multi-operation processing using two-phase locking or multi-operation processing using timestamps can be used to utilize hardware resources such as a CPU and a disk effectively.

In multi-operation processing using two-phase locking, each transaction does not acquire locks as with the conventional two-phase locking protocol; instead, a synthetic transaction created from a large number of transactions acquires locks. This allows reduction in the number of resource usages for operating system processes and locks.

THE BEST MODE FOR CARRYING OUT THE INVENTION

In order to execute a large number of transactions efficiently in parallel, the present invention proposes a transaction processing system of database using multi-operation processing providing concurrency control of transactions.

In addition, in order to execute multiple synthetic transactions concurrently, the present invention also proposes multi-operation processing using two-phase locking, which adds a two-phase locking technique to the multi-operation processing providing concurrency control of transactions; and multi-operation processing using timestamps, which adds a timestamp technique to the multi-operation processing providing concurrency control of transactions.

The inventor of the present invention previously proposed "Query Processing System of Database Using Multi-Operation Processing", which only dealt with query processing (Refer to U.S. Pat. No. 4,109,305).

The main difference between the present invention, multi-operation processing providing concurrency control of transactions, and the previous invention, multi-operation processing dealing only with query processing, is that transactions to perform update operations are also executed with the present invention in addition to transactions to perform only retrieve operations (queries).

<Structure of Database Management System>

FIG. 1 shows the architecture of the present invention: a transaction processing system of database using multi-operation processing providing concurrency control of transactions. This architecture consists of software modules such as a transaction processing system 100, a queue 103, a multi-operation processor 102 and related devices on a computer system 105 including a microprocessor (CPU), main memory, and a secondary storage (disk).

First, if multiple transactions $T_1, T_2, \ldots, T_8$ written in a database language such as SQL are submitted to the transaction processing system 100 from multiple users, the transaction processing system obtains partial operations of the submitted transactions, determines a transaction execution order, creates a precedence graph indicating to update data in the transaction execution order, retrieves the partial operations contained in the transactions as tasks, divides the retrieved tasks into groups for each database relation (access area) to create the groups G1 and G2 (because transactions $T_1, T_2, \ldots, T_8$ must be executed for two different relations in total), creates a synthetic transaction $T_{G1,G2}$ using the created groups G1 and G2, and inserts the synthetic transaction $T_{G1, G2}$ into the queue 103.

After inserting the synthetic transaction $T_{G1,G2}$ into the queue 103, the multi-operation processor 102 retrieves the synthetic transaction $T_{G1,G2}$ from the queue 103. If there are five operating system processes available for the transaction processing system, process 1 executes group G1 contained in the synthetic transaction $T_{G1,G2}$ using multi-operation processing, and process 2 executes group G2 contained in the synthetic transaction $T_{G1,G2}$ using multi-operation processing.

Next, after retrieving the synthetic transaction $T_{G1,G2}$ from the queue 103, if new transactions $T_9, T_{10}$, and $T_{11}$ are submitted to the transaction processing system 100, similarly for the submitted transactions $T_9, T_{10}$, and $T_{11}$, the transaction processing system 100 obtains partial operations of the transactions $T_9, T_{10}$, and $T_{11}$, determines a transaction execution order, creates a precedence graph indicating to update data in the transaction execution order, retrieves the partial operations contained in the transactions as tasks, divides the retrieved tasks into groups for each database relation to create groups G3, G4, and G5 (because the transactions $T_9, T_{10}$, and $T_{11}$ must be executed for three different relations in total), creates a synthetic transaction $T_{G3,G4,G5}$ by using the created groups G3, G4, and G5, and inserts the synthetic transaction $T_{G3,G4,G5}$ into the queue 103.

If the multi-operation processor (102) is currently executing the synthetic transaction $T_{G1,G2}$ using process 1 and process 2, the remaining processes, process 3, process 4, and process 5 are used to execute the synthetic transaction $T_{G3,G4,G5}$.

<Flowchart of Transaction Processing System Using Multi-Operation Processing>

Figures 1, 2:
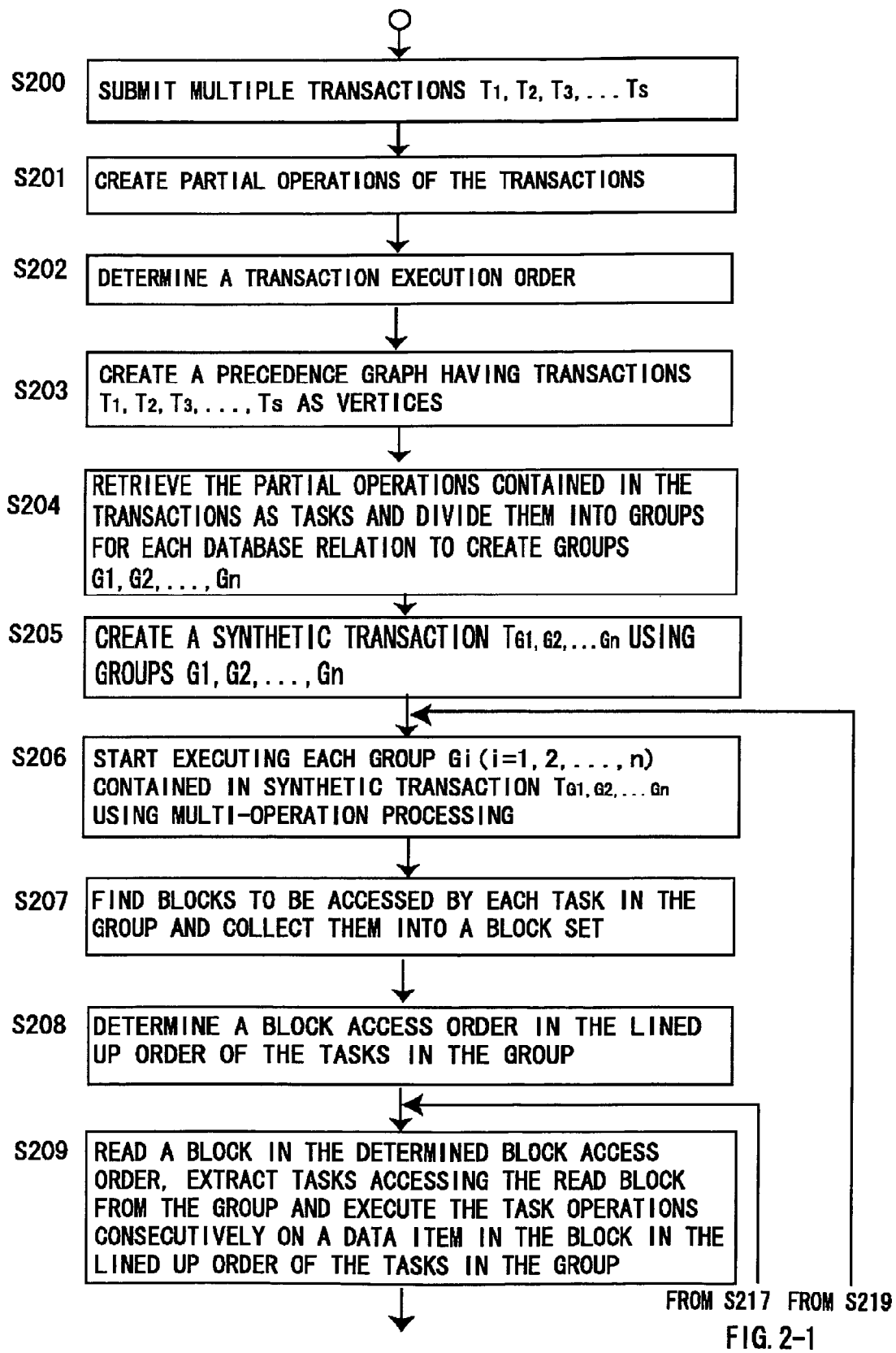
Figure 2:
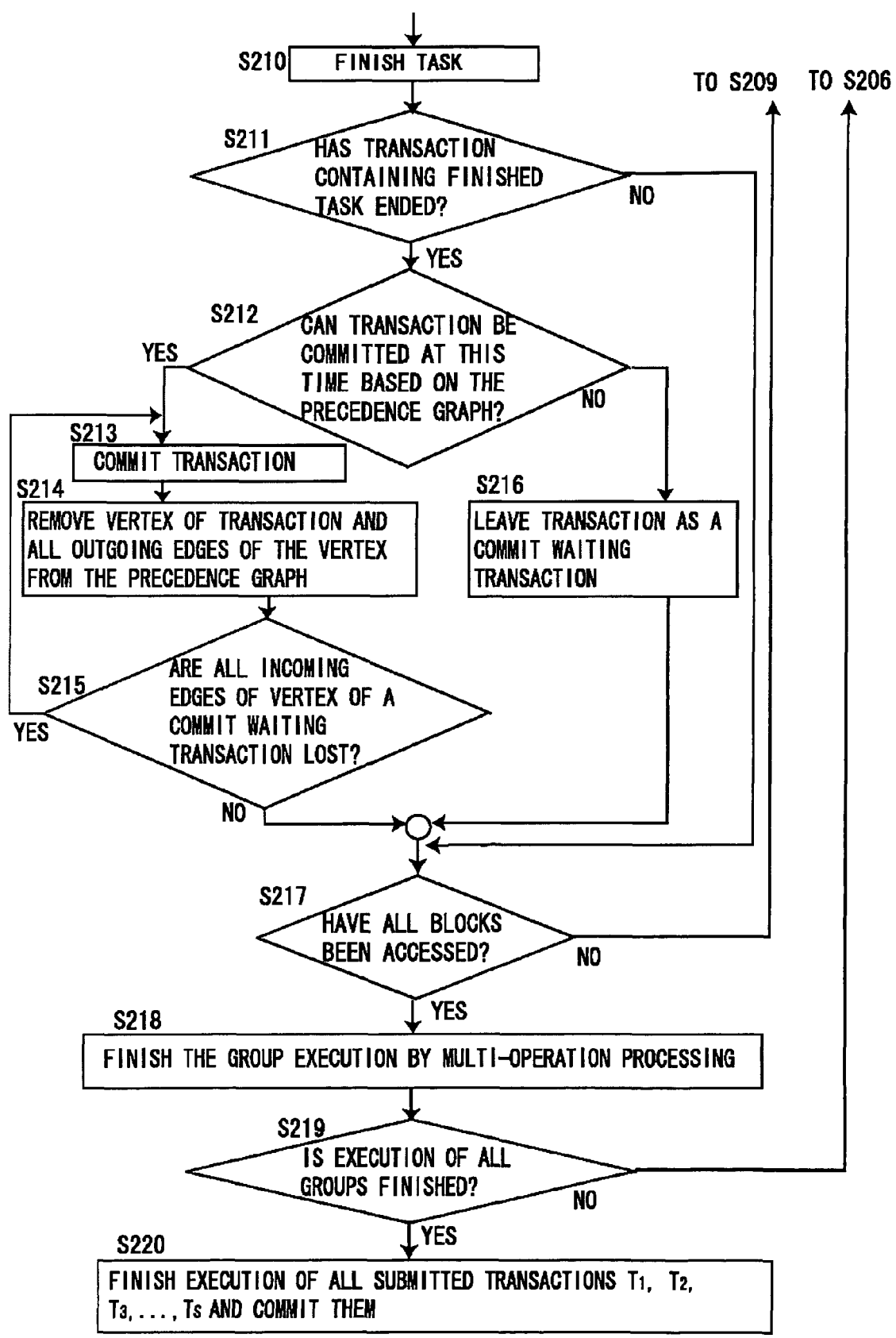

The flowcharts of FIG. 2-1 and FIG. 2-2 specify a series of executing transactions on the transaction processing system of database using multi-operation processing providing concurrency control of transactions.

First, in FIG. 2-1, transactions $T_1, T_2, T_3, \ldots, T_S$ written in a relational database language such as structured query language (SQL) are submitted to the transaction processing system 100 of the database server from multiple users (S200).

The transaction processing system 100 creates partial operations of the transactions by transforming the submitted transactions into executable operations (S201). Once the partial operations of the transactions are created, a transaction execution order is determined (S202).

After determining the transaction execution order, a precedence graph having transactions $T_1, T_2, T_3, \ldots, T_S$ as vertices is created (S203).

In creating the precedence graph, if some of the transactions $T_1, T_2, T_3, \ldots T_S$ perform their operations on the same data item, a directed edge is created for the data item and is drawn from the vertex of the first transaction to perform its operation to the vertex of subsequent transaction to perform its operation to clarify the transaction execution order for the data item.

After creating the precedence graph, the partial operations contained in the transactions are retrieved as tasks and the retrieved tasks are divided into groups for each database relation (access area) to create groups G1, G2, . . . , Gn (S204).

Then, by using the created groups G1, G2, . . . , Gn, a synthetic transaction $T_{G1, G2, \ldots, Gn}$ is created (S205).

Each group Gi (i=1, 2, . . . , n) contained in the synthetic transaction $T_{G1, G2, \ldots, Gn}$ is executed using the multi-operation processor 102 (S206).

The multi-operation processor 102 finds blocks to be accessed by each task in the group and collects the blocks into a block set (S207).

Once the blocks are collected into block sets, a block access order is determined in the lined up order of the tasks in the group (S208).

The multi-operation processor 102 reads a block in the determined block access order, extracts tasks accessing the read block from the group, and executes the task operations consecutively on a data item in the block in the lined up order of the tasks in the group (S209).

Once the execution of a task for the block is finished (FIG. 2-2: S210), check whether the transaction containing the finished task is ended (S211).

Whether the transaction is ended is checked based on whether the execution of all of the tasks contained in the transaction is finished.

If the transaction is not ended, check whether all of the blocks specified in the block access order have been accessed (S217).

If the transaction is ended, determine whether the transaction can be committed at this time based on the precedence graph (S212).

Whether the transaction can be committed at this time is determined based on whether the vertex of the ended transaction contains an incoming edge in the precedence graph.

If an incoming edge exists in the vertex of the ended transaction and thus the transaction cannot be committed at this time, the transaction is left as a commit-waiting transaction (S216).

If there are no incoming edges so that the transaction can be committed, the transaction is committed (S213) and the vertex of the transaction and all of the outgoing edges from the vertex are removed from the precedence graph (S214).

Also, if removing the edges causes the vertex of some other commit-waiting transaction to lose all of its incoming edges (S215), the other transaction is also committed, and the vertex of the transaction and all of the outgoing edges from the vertex are also removed from the precedence graph. In this manner, transactions are committed repeatedly (S213).

Once the operations for the accessed block are finished, check whether all of the blocks specified in the block access order have been accessed (S217).

If un-accessed blocks still remain, the multi-operation processor 102 reads the next block to be accessed from the disk in the block access order, extracts tasks accessing the read block from the group, and, executes the task operations, which are partial operations of the transactions, consecutively on a data item in the read block in the lined up order of the tasks in the group (209).

Once all of the blocks specified in the block access order are accessed, the group execution is completed (S218).

Once the group execution is completed, check whether all of the groups contained in the synthetic transaction have been executed (S219).

If some groups still remain, the next group is retrieved from the synthetic transaction and executed using multi-operation processing.

Group execution is repeated in this manner (S206).

Once all of the groups contained in the synthetic transaction are executed, the execution of the synthetic transaction is completed. As a result, all of the submitted transactions $T_1, T_2, T_3, \ldots, T_S$ are executed and committed (S220).

A summary of multi-operation processing providing concurrency control of transactions has been described with FIG. 1, FIG. 2-1, and FIG. 2-2.

In the following section, the transaction processing system of database using multi-operation processing providing concurrency control of transactions is described in more detail.

In Section 1, steps and examples of transaction processing using multi-operation processing providing concurrency control of transactions are given. In Section 2, two techniques: multi-operation processing using two-phase locking; and multi-operation processing using timestamps are proposed for concurrent execution of multiple synthetic transactions. Steps and examples of executing multiple synthetic transactions concurrently are then given using these techniques.

In Section 3, a specific example of processing transactions having complex and advanced queries including join operations by using multi-operation processing providing concurrency control of transactions is given.

In Section 4, in order to compare the transaction processing speed of the two-phase locking protocol of conventional transaction processing and the transaction processing speed of multi-operation processing providing concurrency control of transactions according to the present invention, our originally designed database management system software MOP-DB is used to show experiment results of using each method.

1. Multi-Operation Processing Providing Concurrency Control of Transactions

1.1 Steps of Multi-Operation Processing Providing Concurrency Control of Transactions

[(1) Creating Partial Operations of Transactions (S201)]

When multiple transactions $T_1, T_2, T_3, \ldots, T_s$ are submitted to the database management system (S200), partial operations of the transaction specifying a write operation on record r as write_item(r) and a read operation on record r as read_item(r) are created for each transaction (S201).

[(2) Determining a Transaction Execution Order]

Once the partial operations of the transactions are obtained, a transaction execution order is determined for the submitted multiple transactions $T_1, T_2, T_3, \ldots, T_s$ (S202).

In order to determine the transaction execution order, the processing cost of each transaction is obtained based on the partial operations of the transaction, and the transactions are then sorted in the order from the transaction of smaller processing cost to the transaction of larger processing cost to determine the transaction execution order.

In some case, if the arrival time of a transaction is more important than the processing cost of a transaction, the transaction arrival time can be used to sort the transactions to determine the transaction execution order.

[(3) Creating a Precedence Graph (S203)]

After determining the transaction execution order, a precedence graph having transactions $T_1, T_2, T_3, \ldots, T_s$ as vertices is created (S203). In creating the precedence graph, if some of transactions $T_1, T_2, T_3, \ldots, T_s$ perform their operations on the same data item, a directed edge is created for the data item and is drawn from the vertex of the first transaction to perform its operation to vertex of the subsequent transaction to perform its operation.

When the transactions are sorted in the order of transaction processing cost, an edge is drawn from the vertex of the transaction having smaller processing cost to the vertex of the transaction having larger processing cost.

On the other hand, when the transactions are sorted in the order of transaction arrival time, an edge is drawn from the vertex of the transaction arriving first to the vertex of the transaction arriving next.

[(4) Grouping Tasks (S204)]

Each partial operation such as an update operation and a retrieve operation contained in transactions $T_1, T_2, T_3, \ldots, T_s$ is retrieved as task $t_i^j$ (i denotes transaction number, j denotes operation number in the transaction) and divided into groups for each database relation, which is the access area of the database, to create groups G1, G2, . . . , Gn (204) in the transaction execution order.

[(5) Creating a Synthetic Transaction (S205)]

After dividing the tasks into groups for each database relation, a synthetic transaction $T_{G1, G2, \ldots, Gn}$ is created using the created groups G1, G2, ..., Gn (S205).

In order to execute the synthetic transaction $T_{G1, G2, \ldots, Gn}$, each group contained in the synthetic transaction $T_{G1, G2, \ldots, Gn}$ is executed using multi-operation processing.

[(6) Executing Each Group Using Multi-Operation Processing]

First, group G1 is retrieved from the synthetic transaction $T_{G1, G2, \ldots, Gn}$, and execution thereof is then started using multi-operation processing (S206).

[(7) Detecting Access Area of Tasks]

Using the indices of the relation that tasks $t_1, t_2, t_3, \ldots, t_p$ access, certain blocks (stored locations of the blocks) within the blocks $b_1, b_2, b_3, \ldots, b_m$ in the relation that tasks $t_1, t_2, t_3, \ldots, t_p$ in group G1 need to access are located and collected into block sets $B_1, B_2, B_3, \ldots, B_p$ respectively (S207).

In other words, for each task $t_i$ (i=1, 2, 3, ..., p), a block set $B_i=\{$a set of blocks that each task $t_i$ needs to access in the relation S consisting of blocks $b_1, b_2, \ldots, b_m\}$(i=1, 2, 3, ..., p) is found. In finding such a block set, only the indices of the relation are used to find the stored location of the blocks, and no disk access is carried out to blocks in the relation for locating the stored location of the blocks.

[(8) Determining a Block Access Order (S208)]

Once block sets $B_1, B_2, B_3, \ldots, B_p$ corresponding to the tasks $t_1, t_2, t_3, \ldots, t_p$ in group G1 are found, the union of block sets $B_1, B_2, B_3, \ldots, B_p$ is obtained. First, the union of the block sets corresponding to tasks $t_1$ and $t_2$ is obtained, then the union of that union and block set $B_3$ corresponding to task $t_3$ is obtained. This is repeated successively, where finally the union of the last union and block set $B_p$ corresponding to task $t_p$ is obtained.

In obtaining each union, the blocks to be added into the union successively are inserted at the end of the union. Then, the last obtained union helps determine a block access order specifying which block to be accessed first and which block to be accessed last in the relation for executing the tasks, which are partial operations of the transactions, in the transaction execution order (S208).

The reason for obtaining the union in this manner is to allow the blocks to be accessed only once from the disk instead of accessing the blocks many times from the disk to read the blocks in the relation required for executing the tasks in the group.

[(9) Executing Tasks for Each Block (S209)]

[Executing Tasks For Block $b_j$]

According to the determined block access order, the first block to be accessed in the relation is expressed as $b_j$ ($1 \leq j \leq m$). In order to check if the tasks $t_1, t_2, t_3, \ldots, t_p$ in the group G1 need to be executed for block $b_j$, block $b_j$ is expressed as a set $\{b_j\}$ and the intersections ($\cap$) of set $\{b_j\}$ and the block sets $B_1, B_2, B_3, \ldots, B_p$ corresponding to the tasks $t_1, t_2, t_3, \ldots, t_p$ are obtained. All of the tasks corresponding to the block sets of which intersection became $\{b_j\}$ are executed for block $b_j$, and the tasks corresponding to the block sets of which intersection became an empty set ($\{\ \}$) are not executed for block $b_j$.

Furthermore, when some tasks need to process the same data item in block $b_j$, the task operations, which are partial operations of the transactions, are executed consecutively on the data item according to the transaction execution order indicated in the precedence graph.

Once all of the tasks in group G1 requiring to be executed for block $b_j$ are executed, block $b_j$ is no longer needed to be accessed again. Therefore, the differences of the block sets of which intersection became $\{b_j\}$ and set $\{b_j\}$ are obtained and the obtained differences are expressed as block sets $B_i^{(1)}$ (i=1, 2, ..., p); the tasks corresponding to the block sets of which difference became an empty set ($\{\ \}$) are finished (S210), and the tasks corresponding to the block sets of which difference did not become an empty set are not finished.

[End and Commit Transaction]

Once some task execution is finished at block $b_j$, check whether the transaction containing the finished task is ended (S211). When the execution of all of the tasks contained in the transaction is finished (S211: YES), the transaction is ended.

Once the transaction is ended, whether the ended transaction can be committed at this time is determined based on the precedence graph (S212). When an incoming edge exists to the vertex of the ended transaction (S212: NO), the transaction is not committed and is left as a commit-waiting transaction (S216).

If there is no incoming edge to the vertex of the ended transaction (S212: YES), the transaction is committed (S213). Once the transaction is committed, the vertex of the transaction and all of the outgoing edges from the vertex are removed from the precedence graph (S214).

In doing so, if removing the edges causes the vertices of some other commit-waiting transactions to lose all of their incoming edges (S215: YES), these commit-waiting transactions are also committed (S213).

The reason for this is that, if the vertices have no incoming edges, a transaction that previously wrote to the same data item is already committed; therefore, other transactions reading the written data item may also be committed.

[Task Processing for Block $b_k$]

On the other hand, if all of the blocks are not accessed yet (S217: NO), by returning to S209, the next block $b_k$ ($1 \leq k \leq m$) is read in the block access order and block $b_k$ is expressed as a set $\{b_k\}$, and the intersections of the block sets corresponding to the tasks in the group, excluding the tasks already executed, and set $\{b_k\}$ are obtained. The tasks corresponding to the block sets of which intersection became $\{b_k\}$ are then executed for block $b_k$.

Once all of the tasks in group G1 requiring to be executed for block $b_k$ are executed, block $b_k$ is no longer needed to be accessed again. Therefore, the differences of block sets $B_i^{(1)}$ (the block sets obtained from the last differences after executing for block $b_j$) and set $\{b_k\}$ are obtained. The obtained differences are then expressed as blocks sets $B_i^{(2)}$ (i=1, 2, ..., n); the tasks corresponding to the block set of which difference became an empty set ($\{\ \}$) are finished, and the tasks corresponding to the block set of which difference did not become an empty set are not finish yet.

[End and Commit Transaction]

Once some task execution is finished at block $b_k$ (S210), whether the transaction containing the finished task is ended is checked (S211). When the execution of all of the tasks contained in the transaction is finished, the transaction is ended. Once the transaction is ended, determine whether the transaction can be committed at this time based on the precedence graph (S212).

When an incoming edge exists in the vertex of the ended transaction (S212: NO), the transaction is not committed and is left as a commit-waiting transaction (S216).

If no incoming edge exists in the vertex of the ended transaction (S212: YES), the transaction is committed (S213). Once the transaction is committed, the vertex of the transaction and all of the outgoing edges from the vertex are removed from the precedence graph.

By repeating the steps described above, the rest of the blocks are accessed in the block access order and the remaining tasks in the group are executed for the accessed blocks. As a result, the execution of all of the tasks in group G1 is finished (S217: YES).

[(10) Executing Groups G2, . . . , Gn Using Multi-Operation Processing]

Once the execution of group G1 is finished (S218), the remaining groups G2, . . . , Gn are retrieved successively from the synthetic transaction $T_{G1, G2, \ldots, Gn}$ and then executed using the same technique used for executing group G1 (S219: NO).

Once all of the groups are executed (S219: YES), the execution of the synthetic transaction $T_{G1, G2, \ldots, Gn}$ is completed. Therefore, all of the submitted transactions $T_1$, $T_2$, $T_3$, . . . , $T_s$ are executed and committed (S220).

1.2. Examples of Multi-Operation Processing Providing Concurrency Control of Transactions The steps of multi-operation processing providing concurrency control of transactions given in Section 1.1 are described in detail using the following specific examples.

Figures 1, 3:
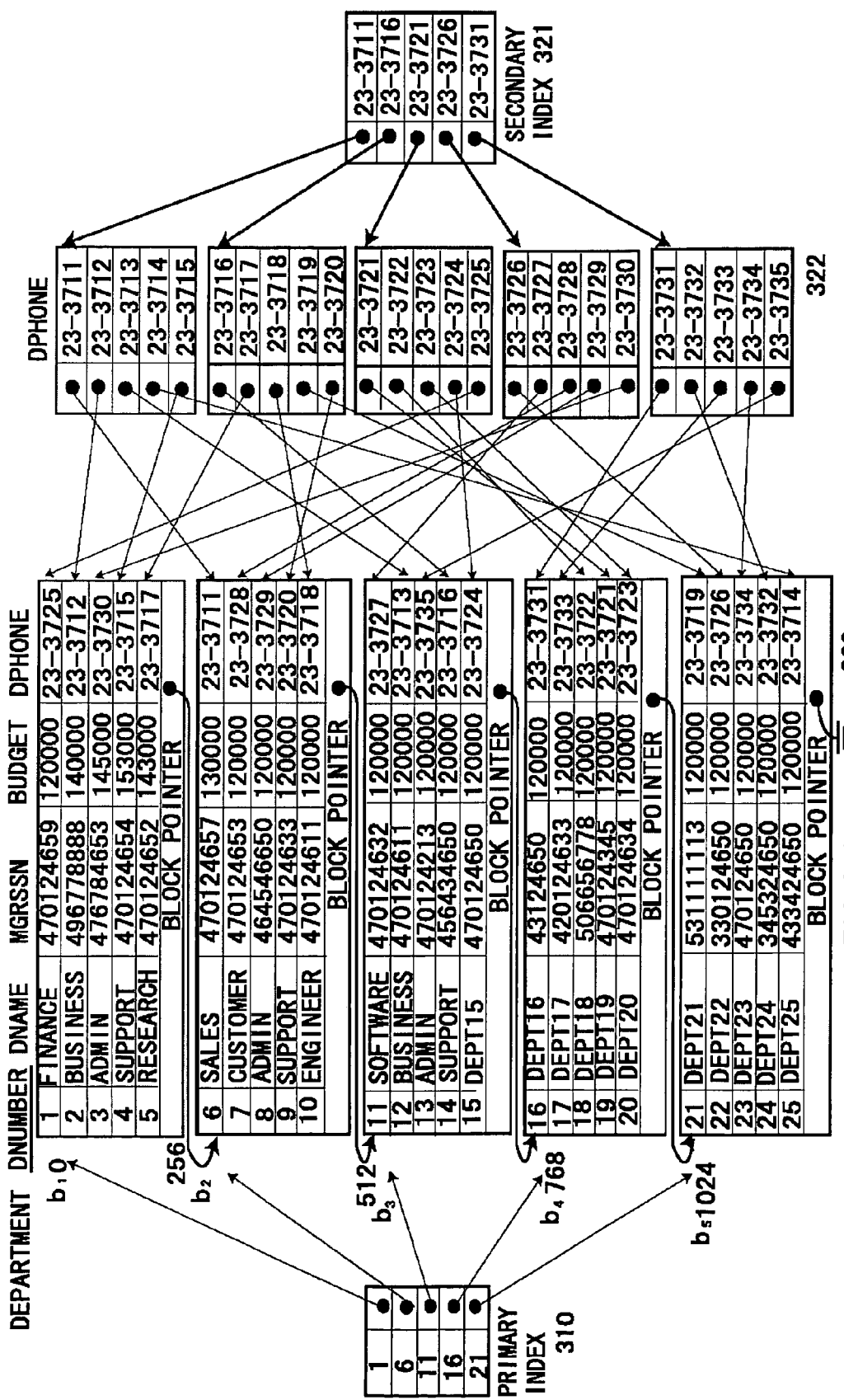
Figures 2, 3:
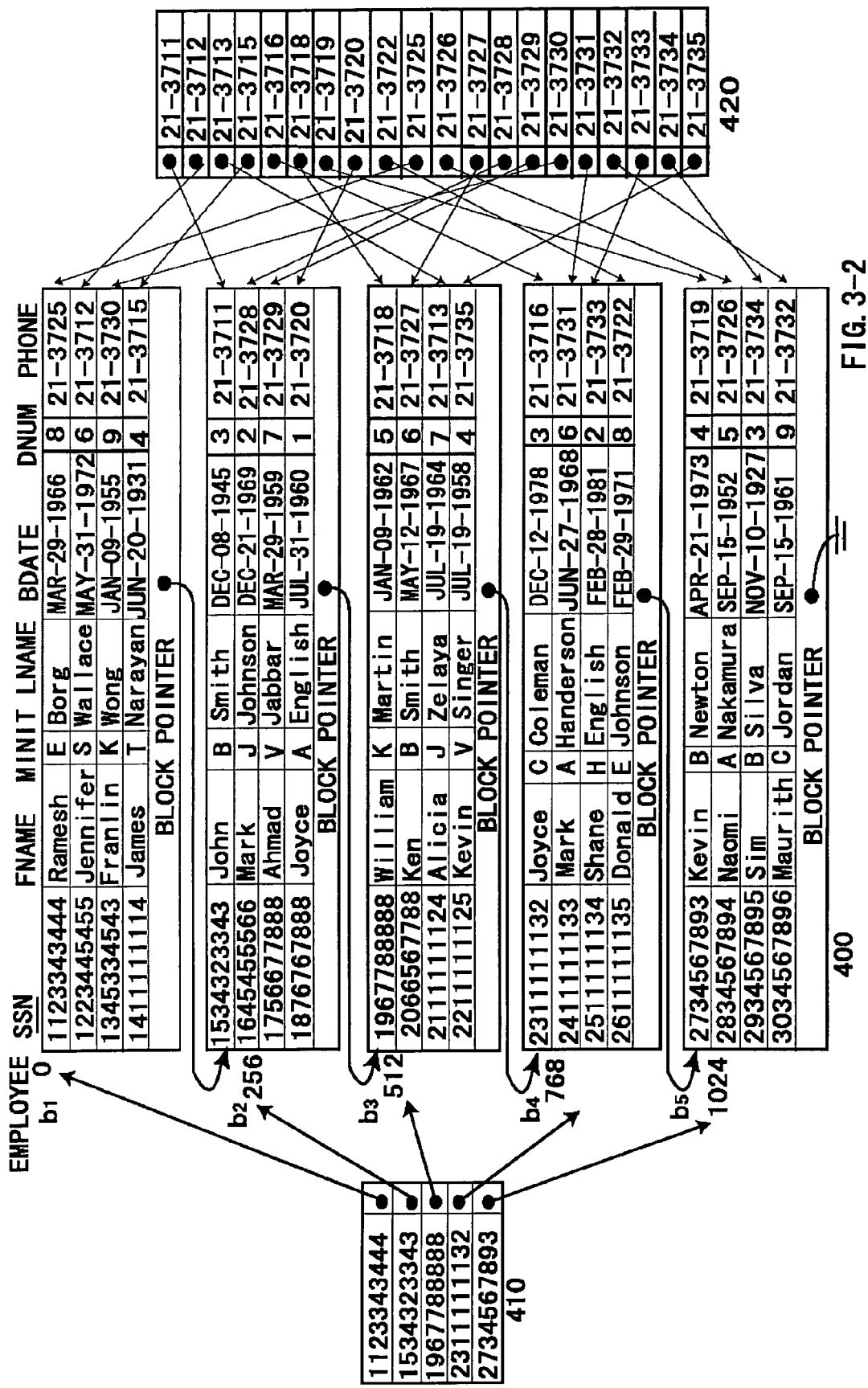

FIG. 3-1 shows a database relation DEPARTMENT (300) created using a fixed length record: the relation DEPARTMENT (300) stores 25 records in 5 blocks; each block has 5 records; each record stores data containing attributes DNUMBER (department number), DNAME (department name), MGRSSN (manager salaried staff number), BUDGET, and DPHONE (department phone number); and each block has a block pointer pointing to the next block. A primary key DNUMBER has a primary index (310) and the primary index (310) has an index pointer pointing to each block. Also, attribute DPHONE has a secondary index (321,322), and the secondary index (321,322) has an index pointer pointing to each record.

A database relation EMPLOYEE of FIG. 3-2 is created using a fixed length record: the relation EMPLOYEE (400) stores 20 records in 5 blocks; each block has 4 records; each record stores data containing attributes SSN (salaried staff number), FNAME (first name), MINIT (middle name initial), LNAME (last name), BDATE (birth date), DNUM (department number), and PHONE (phone number); and each block has a block pointer pointing to the next block. A primary key SSN has a primary index (410) and the primary index (410) has an index pointer pointing to each block. Also an attribute PHONE has a secondary index (420), and the secondary index (420) has an index pointer pointing to each record.

In addition to the relation DEPARTMENT (300) of FIG. 3-1 and the relation EMPLOYEE (400) of FIG. 3-2, there is another relation PROJECT which is not shown as a diagram in the database. The relations DEPARTMENT (300), EMPLOYEE (400), and PROJECT are access areas of the relational database system, where the blocks in the relations are access units on disk in which data of the database is stored.

Next, in order to discuss multi-operation processing providing concurrency control of transactions, execution of the following transactions $T_1$, $T_2$, $T_3$, $T_4$, $T_5$, $T_6$, $T_7$, $T_8$ to perform their operations to the relations mentioned above is described.

In the following example, each transaction starts with a statement BEGIN WORK and ends with a statement COMMIT WORK.

($T_1$):BEGIN WORK;
Update Operation 1 of $T_1$
UPDATE DEPARTMENT
SET BUDGET=BUDGET+10000
WHERE DNUMBER=7;
Update Operation 2 of $T_1$
UPDATE DEPARTMENT
SET BUDGET=BUDGET+20000
WHERE DNUMBER=9;
Update Operation 3 of $T_1$
UPDATE EMPLOYEE
SET DNUM=4
WHERE SSN=2411111133;
COMMIT WORK;
($T_2$):BEGIN WORK;
Update Operation 1 of $T_2$
UPDATE DEPARTMENT
SET BUDGET=BUDGET+22000
WHERE DPHONE=23-3728;
Update Operation 2 of $T_2$
UPDATE DEPARTMENT
SET BUDGET=BUDGET+30000
WHERE DNUMBER>6 AND DNUMBER<9;
COMMIT WORK;
($T_3$):BEGIN WORK;
Update Operation 1 of $T_3$
UPDATE DEPARTMENT
SET MGRSSN=470124116
WHERE DNUMBER=6 OR DNUMBER=19;
Retrieve Operation 1 of $T_3$
SELECT DNUMBER, DNAME
FROM DEPARTMENT
WHERE DNUMBER=19;
COMMIT WORK;
($T_4$):BEGIN WORK;
Update Operation 1 of $T_4$
UPDATE DEPARTMENT
SET DPHONE=23-3736
WHERE DNUMBER=3;
Update Operation 2 of $T_4$
UPDATE DEPARTMENT
SET DPHONE=23-3737
WHERE DNUMBER=19;
Update Operation 3 of $T_4$
UPDATE EMPLOYEE
SET BDATE='DEC-27-1971'
WHERE SSN=2066567788;
COMMIT WORK;
($T_5$):BEGIN WORK;
Update Operation 1 of $T_5$
UPDATE DEPARTMENT
SET BUDGET=BUDGET−24000
WHERE DNUMBER=7 OR DNUMBER=8;
Update Operation 2 of $T_5$
UPDATE DEPARTMENT
SET BUDGET=BUDGET−11000
WHERE DNUMBER=14;
COMMIT WORK;
($T_6$):BEGIN WORK;
Update Operation 1 of $T_6$
UPDATE DEPARTMENT
SET BUDGET=BUDGET−15000
WHERE DNUMBER=3 OR DNUMBER=14;
Update Operation 2 of $T_6$
UPDATE DEPARTMENT
SET MGRSSN=433-424659
WHERE DNUMBER=22;
Retrieve Operation 3 of $T_6$
SELECT*
FROM DEPARTMENT
WHERE DNUMBER=23;
COMMIT WORK;
($T_7$):BEGIN WORK;
Update Operation 1 of $T_7$ UPDATE EMPLOYEE
SET BDATE='DEC-27-1971'
WHERE SSN=1645455566;
COMMIT WORK;
($T_S$):BEGIN WORK;
Update Operation 1 of $T_S$
UPDATE EMPLOYEE
SET DNUM=7
WHERE PHONE=21-3728 OR SSN=2066567788;
COMMIT WORK;

[(1) Obtaining Partial Operations of Transactions (S201)]

For the submitted transitions $T_1, T_2, T_3, T_4, T_5, T_6, T_7, T_8$, a read operation on a record r performed by each transaction is expressed as read_item(r), and a write operation on a record r performed by each transaction is expressed as write_item(r) to create partial operations of each transaction in the following. A record in the relation DEPARTMENT is expressed as D.ri (i=1, 2, 3, . . . , 25), and a record in the relation EMPLOYEE is expressed as E.ri (i=1, 2, 3, . . . , 20). The stored location of each record is found using the indices of the relations.

Each partial operation such as an update operation and a retrieve operation contained in a transaction is expressed as task $t_i^j$ (i denotes transaction number, and j denotes operation number in the transaction).

($T_1$):
   ($t_1^1$):read_item(D.r7);
   D.r7.BUDGET:=D.r7.BUDGET+10000;
   write_item(D.r7);
   ($t_1^2$):read_item(D.r9);
   D.r9.BUDGET:=D.r9.BUDGET+20000;
   write_item(D.r9);
   ($t_1^3$):read_item(E.r14);
   E.r14.DNUM:=4;
   write_item(E.r14);

($T_2$):
   ($t_2^1$):read_item(D.r7);
   D.r7.BUDGET:=D.r7.BUDGET+22000;
   write_item(D.r7);
   ($t_2^2$):read_item(D.r7);
   D.r7.BUDGET:=D.r7.BUDGET+30000;
   write_item(D.r7);
   read_item(D.r8);
   D.r8.BUDGET:=D.r8.BUDGET+30000;
   write_item(D.r8);

($T_3$):
   ($t_3^1$):read_item(D.r6);
   D.r6.MGRSSN:=470124116;
   write_item(D.r6);
   read_item(D.r19);
   D.r19.MGRSSN:=470124116;
   write_item(D.r19);
   ($t_3^2$):read_item(D.r19);

($T_4$):
   ($t_4^1$):read_item(D.r3);
   D.r3.DPHONE:=23-3736;
   write_item(D.r3);
   ($t_4^2$):read_item(D.r19);
   D.r19.DPHONE:=23-3737;
   write_item(D.r19);
   ($t_4^3$):read_item(E.r10);
   E.r10.BDATE:='DEC-27-1971';
   write_item(E.r10);

($T_5$):
   ($t_5^1$):read_item(D.r7);
   D.r7.BUDGET:=D.r7.BUDGET−24000;
   write_item(D.r7);
   read_item(D.r8);
   D.r8.BUDGET:=D.r8.BUDGET−24000;
   write_item(D.r8);
   ($t_5^2$):read_item(D.r14);
   D.r14.BUDGET:=D.r14.BUDGET−11000;
   write_item(D.r14);

($T_6$):
   ($t_6^1$):read_item(D.r3);
   D.r3.BUDGET:=D.r3.BUDGET−15000;
   write_item(D.r3);
   read_item(D.r14);
   D.r14.BUDGET:=D.r14.BUDGET−15000;
   write_item(D.r14);
   ($t_6^2$):read_item(D.r22);
   D.r22.MGRSSN:=433424659;
   write_item(D.r22);
   ($t_6^3$):read_item(D.r23);

($T_7$):
   ($t_7^1$):read_item(E.r6);
   E.r6.BDATE:='DEC-27-1971';
   write_item(E.r6);

($T_8$):
   ($t_8^1$):read_item(E.r6);
   E.r6.DNUM:=7;
   write_item(E.r6);
   read_item(E.r10);
   E.r10.DNUM:=7;
   write_item(E.r10);

[(2) Determining a Transaction Execution Order (S202)]

Once the partial operations of the transactions are obtained, a transaction execution order for the transactions $T_1, T_2, T_3, T_4, T_5, T_6, T_7$ and $T_8$ is determined.

In order to determine the transaction execution order, the processing cost of each transaction is obtained based on the partial operations contained in the transaction, and the transactions are sorted in the order from the transaction of smaller processing cost.

By obtaining the processing costs of the transactions based on the partial operations of the transactions, the following table can be obtained.

TABLE 1

| | Transaction | | | | | | | |
|---|---|---|---|---|---|---|---|---|
| | $T_1$ | $T_2$ | $T_3$ | $T_4$ | $T_5$ | $T_6$ | $T_7$ | $T_8$ |
| Processing Cost | 2 | 1 | 2 | 3 | 2 | 3 | 1 | 2 |

The processing cost of a transaction is the number of block accesses required for executing the transaction.

For example, transaction $T_1$ needs to access records r7 and r9 stored in block $b_2$ in the relation DEPARTMENT and record r14 stored in block $b_4$ in the relation EMPLOYEE, thus two block accesses are required; therefore, the processing cost of transaction $T_1$ is 2.

Once the processing costs of the transactions are obtained, the transaction execution order may be determined as $T_2, T_7, T_3, T_1, T_5, T_8, T_4, T_6$ by sorting the transactions in the order from the transaction of smaller processing cost as follows. Here, sort ( . . . ) means ordering the transactions in the order from the transaction of smaller processing cost.

sort $(T_1, T_2, T_3, T_4, T_5, T_6, T_7, T_8) \rightarrow (T_2, T_7, T_1, T_3, T_5, T_8, T_4, T_6)$

[(3) Creating a Precedence Graph (S203)]

Figure 4:
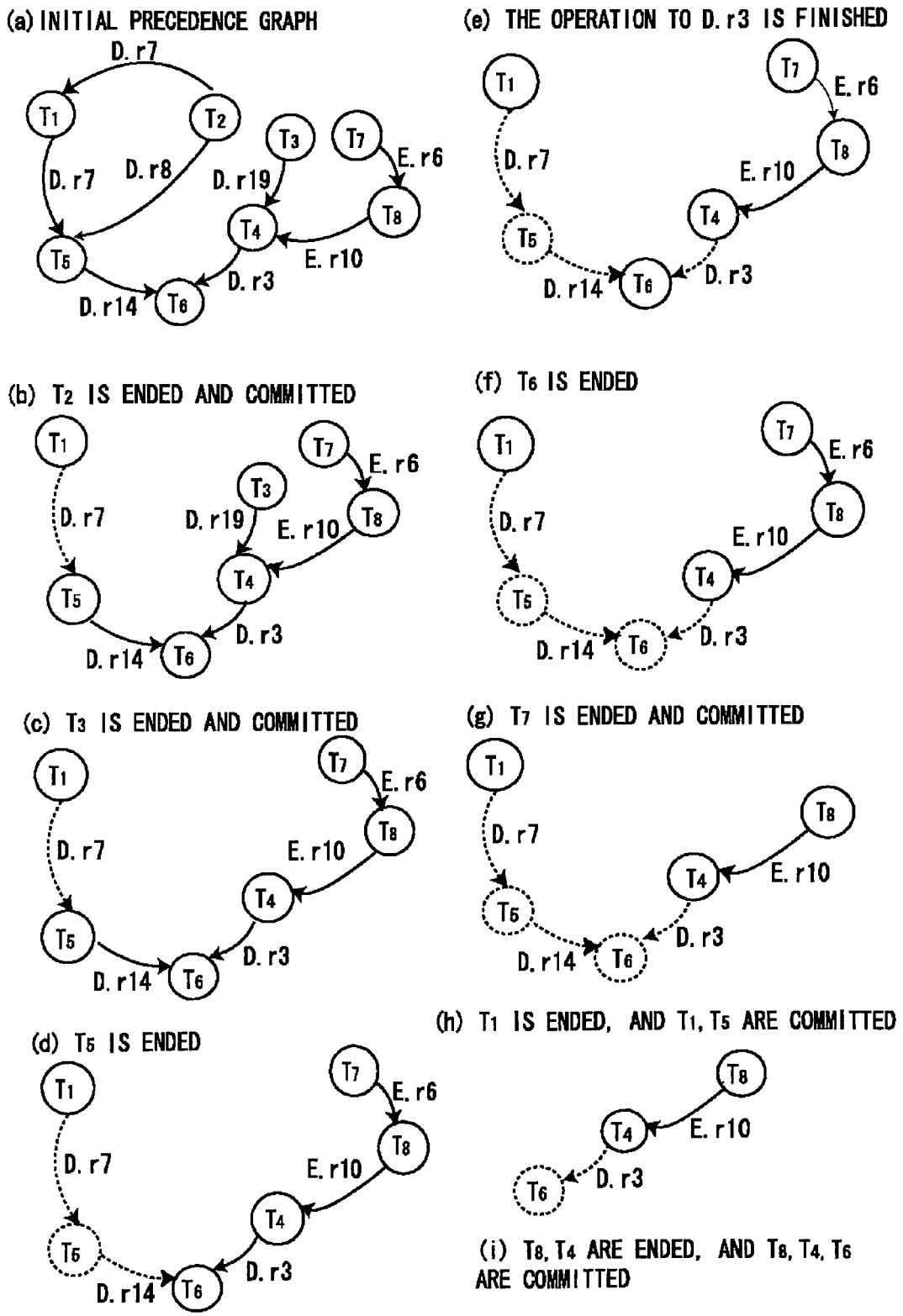
FIG. 4 is a diagram showing an exemplary precedence graph indicating data update order by multiple transactions.

Once the transaction execution order is determined, the precedence graph shown in FIG. 4(*a*) having the transactions $T_2$, $T_7$, $T_1$, $T_3$, $T_5$, $T_8$, $T_4$ and $T_6$ as vertices is created. In creating the precedence graph, when some transactions within the transactions $T_2$, $T_7$, $T_1$, $T_3$, $T_5$, $T_8$, $T_4$ and $T_6$ need to process the same data item, a directed edge is created for the data item and is drawn from the vertex of the first transaction to perform its operation to the vertex of the subsequent transaction to perform its operation to clarify the transaction execution order for the data item.

If a data item is to be processed by only a single transaction, no edges are created for the data item in the precedence graph.

Since transactions $T_4$ and $T_6$ perform their update operations on the same record D.r3 in the relation DEPARTMENT, an edge is drawn from vertex $T_4$ to vertex $T_6$ according to the transaction execution order.

Since transactions $T_2$, $T_1$, and $T_5$ perform their update operations on the same record D.r7 in the relation DEPARTMENT, an edge is drawn from vertex $T_2$ to vertex $T_1$, and another edge is drawn from vertex $T_1$ to vertex $T_5$ according to the transaction execution order.

Since transactions $T_2$ and $T_5$ perform their update operations on the same record D.r8 in the relation DEPARTMENT, an edge is drawn from vertex $T_2$ to vertex $T_5$ according to the transaction execution order.

Since transactions $T_5$ and $T_6$ perform their update operations on the same record D.r14 in the relation DEPARTMENT, an edge is drawn from vertex $T_5$ to vertex $T_6$ according to the transaction execution order.

Since transactions $T_3$ and $T_4$ perform their update operations on the same record D.r19 in the relation DEPARTMENT, an edge is drawn from vertex $T_3$ to vertex $T_4$ according to the transaction execution order.

Since transactions $T_7$ and $T_8$ perform their update operations on the same record E.r6 in the relation EMPLOYEE, an edge is drawn from vertex $T_7$ to vertex $T_8$ according to the transaction execution order.

Since transactions $T_8$ and $T_4$ perform their update operations on the same record E.r10 in the relation EMPLOYEE, an edge is drawn from vertex $T_8$ to vertex $T_4$ according to the transaction execution order.

Because the precedence graph shown in FIG. 4(a) is created based on the transaction execution order determined at the beginning, there are no cycles in the precedence graph. Therefore, any transaction schedule derived from this precedence graph is a serializable schedule.

[(4) Grouping Tasks (S204)]

Tasks $t_2^1$, $t_2^2$, $t_7^1$, $t_1^1$, $t_1^2$, $t_1^3$, $t_3^1$, $t_3^2$, $t_5^1$, $t_5^2$, $t_8^1$, $t_4^1$, $t_4^2$, $t_4^3$, $t_6^1$, $t_6^2$ and $t_6^3$, which are partial operations of the transactions $T_2$, $T_7$, $T_1$, $T_3$, $T_5$, $T_8$, $T_4$ and $T_6$, are retrieved from the transactions and divided into groups for each database relation, and the tasks collected into groups are lined up in the transaction execution order as follows.

| | |
|---|---|
| DEPARTMENT: | Group G1 = {$t_2^1$, $t_2^2$, $t_1^1$, $t_1^2$, $t_3^1$, $t_3^2$, $t_5^1$, $t_5^2$, $t_4^1$, $t_4^2$, $t_6^1$, $t_6^2$, $t_6^3$} |
| EMPLOYEE: | Group G2 = {$t_7^1$, $t_1^3$, $t_8^1$, $t_4^3$} |

The tasks to be performed for the relation DEPARTMENT are collected into group G1.

The tasks to be performed for the relation EMPLOYEE are collected into group G2.

[(5) Creating (S205) and Executing (S206) Synthetic Transaction $T_{G1,G2}$]

Once the tasks are divided and the groups G1 and G2 are created, a synthetic transaction $T_{G1,G2}$ is created using the created groups G1 and G2.

In order to execute the synthetic transaction $T_{G1,G2}$, the groups G1 and G2 contained in the synthetic transaction $T_{G1,G2}$ are executed respectively using multi-operation processing.

[(5-1) Processing Group G]

[(a) Obtaining Block Sets to be Accessed by Tasks (S207)]

Using the primary index (310) and the secondary index (321,322) of the relation DEPARTMENT (300) shown in FIG. 3-1, the blocks in the relation DEPARTMENT (300) that the tasks in the group G1 need to read are found and collected into block sets $B_2^1$, $B_2^2$, $B_1^1$, $B_1^2$, $B_3^1$, $B_3^2$, $B_5^1$, $B_5^2$, $B_4^1$, $B_4^2$, $B_6^1$, $B_6^2$, $B_6^3$ corresponding to the tasks $t_2^1$, $t_2^2$, $t_1^1$, $t_1^2$, $t_3^1$, $t_3^2$, $t_5^1$, $t_5^2$, $t_4^1$, $t_4^2$, $t_6^1$, $t_6^2$, $t_6^3$, respectively as follows.

In finding the block sets, only the indices of the relation are used to find the stored location of the blocks; thus, no disk access is carried out to blocks in the relation to locate the stored locations of the blocks.

| | |
|---|---|
| For task $t_2^1$: | $B_2^1 = \{b_2\}$ |
| For task $t_2^2$: | $B_2^2 = \{b_2\}$ |
| For task $t_1^1$: | $B_1^1 = \{b_2\}$ |
| For task $t_1^2$: | $B_1^2 = \{b_2\}$ |
| For task $t_3^1$: | $B_3^1 = \{b_2, b_4\}$ |
| For task $t_3^2$: | $B_3^2 = \{b_4\}$ |
| For task $t_5^1$: | $B_5^1 = \{b_2\}$ |
| For task $t_5^2$: | $B_5^2 = \{b_3\}$ |
| For task $t_4^1$: | $B_4^1 = \{b_1\}$ |
| For task $t_4^2$: | $B_4^2 = \{b_4\}$ |
| For task $t_6^1$: | $B_6^1 = \{b_1, b_3\}$ |
| For task $t_6^2$: | $B_6^2 = \{b_5\}$ |
| For task $t_6^3$: | $B_6^3 = \{b_5\}$ |

[(b) Determining a Block Access Order (S208)]

Once the block sets corresponding to the tasks in the group are obtained, the union of the block sets is obtained in the lined up order of the tasks in the group, that is, in the order of the tasks $t_2^1$, $t_2^2$, $t_1^1$, $t_1^2$, $t_3^1$, $t_3^2$, $t_5^1$, $t_5^2$, $t_4^1$, $t_4^2$, $t_6^1$, $t_6^2$, $t_6^3$, respectively.

First, empty set $TB_0 = \{\}$ is prepared, and the union of the empty set $TB_0$ and block set $B_2^1$ corresponding to task $t_2^1$ is obtained to create a set $TB_2^1$. Next, the union of set $TB_2^1$ and block set $B_2^2$ corresponding to task $t_2^2$ is obtained to create a set $TB_2^2$. Similarly, the union of block sets $B_1^1$, $B_1^2$, $B_3^1$, $B_3^2$, $B_5^1$, $B_5^2$, $B_4^1$, $B_4^2$, $B_6^1$, $B_6^2$ and $B_6^3$ corresponding to tasks $t_1^1$, $t_1^2$, $t_3^1$, $t_3^2$, $t_5^1$, $t_5^2$, $t_4^1$, $t_4^2$, $t_6^1$, $t_6^2$, and $t_6^3$ are obtained to create sets $TB_1^1$, $TB_1^2$, $TB_3^1$, $TB_3^2$, $TB_5^1$, $TB_5^2$, $TB_4^1$, $TB_4^2$, $TB_6^1$, $TB_6^2$ and $TB_6^3$, respectively, resulting in the following. In this case, the blocks to be added into the union are inserted at the end of the union.

| | |
|---|---|
| | $TB_0 \leftarrow \{\}$ (empty set) |
| Union with block set $B_2^1$: | $TB_2^1 \leftarrow TB_0 \cup B_2^1$, $TB_2^1 = \{b_2\}$ |
| Union with block set $B_2^2$: | $TB_2^2 \leftarrow TB_2^1 \cup B_2^2$, $TB_2^2 = \{b_2\}$ |
| Union with block set $B_1^1$: | $TB_1^1 \leftarrow TB_2^2 \cup B_1^1$, $TB_1^1 = \{b_2\}$ |
| Union with block set $B_1^2$: | $TB_1^2 \leftarrow TB_1^1 \cup B_1^2$, $TB_1^2 = \{b_2\}$ |
| Union with block set $B_3^1$: | $TB_3^1 \leftarrow TB_1^2 \cup B_3^1$, $TB_3^1 = \{b_2, b_4\}$ |
| Union with block set $B_3^2$: | $TB_3^2 \leftarrow TB_3^1 \cup B_3^2$, $TB_3^2 = \{b_2, b_4\}$ |
| Union with block set $B_5^1$: | $TB_5^1 \leftarrow TB_3^2 \cup B_5^1$, $TB_5^1 = \{b_2, b_4\}$ |
| Union with block set $B_5^2$: | $TB_5^2 \leftarrow TB_5^1 \cup B_5^2$, $TB_5^2 = \{b_2, b_4, b_3\}$ |
| Union with block set $B_4^1$: | $TB_4^1 \leftarrow TB_5^2 \cup B_4^1$, $TB_4^1 = \{b_2, b_4, b_3, b_1\}$ |
| Union with block set $B_4^2$: | $TB_4^2 \leftarrow TB_4^1 \cup B_4^2$, $TB_4^2 = \{b_2, b_4, b_3, b_1\}$ |
| Union with block set $B_6^1$: | $TB_6^1 \leftarrow TB_4^2 \cup B_6^1$, $TB_6^1 = \{b_2, b_4, b_3, b_1\}$ |
| Union with block set $B_6^2$: | $TB_6^2 \leftarrow TB_6^1 \cup B_6^2$, $TB_6^2 = \{b_2, b_4, b_3, b_1, b_5\}$ |
| Union with block set $B_6^3$: | $TB_6^3 \leftarrow TB_6^2 \cup B_6^3$, $TB_6^3 = \{b_2, b_4, b_3, b_1, b_5\}$ |

When the union of the block sets is obtained respectively in the lined up order of the tasks as above, the block access can begin at block $b_2$ and end at block $b_5$ from the last obtained union set $TB_6^3$. Therefore, the access order for blocks in the relation DEPARTMENT (300) is determined as ($b_2$, $b_4$, $b_3$, $b_1$, $b_5$).

By using this method to obtain the union of the block sets, the access order for blocks in the relation DEPARTMENT is determined. Then each block can be read in this order, and tasks accessing the read block are extracted from the group and executed, respectively.

[(c) Executing Tasks for Each Block (S209)]

[(c-1) Accessing Block $b_2$]

First, the data of block $b_2$ at stored location 256 in the relation DEPARTMENT is read into the main memory from the disk. In order to check if tasks $t_2^1$, $t_2^2$, $t_1^1$, $t_1^2$, $t_3^1$, $t_3^2$, $t_5^1$, $t_5^2$, $t_4^1$, $t_4^2$, $t_6^1$, $t_6^2$ and $t_6^3$ in group G1 need to be executed for block $b_2$, block $b_2$ is expressed as a set $\{b_2\}$, and the intersections of block sets $B_2^1$, $B_2^2$, $B_1^1$, $B_1^2$, $B_3^1$, $B_3^2$, $B_5^1$, $B_5^2$, $B_4^1$, $B_4^2$, $B_6^1$, $B_6^2$, $B_6^3$ and set $\{b_2\}$ are obtained, resulting in the following.

| | |
|---|---|
| For task $t_2^1$: | $B_2^1 \cap \{b_2\} = \{b_2\}$ |
| For task $t_2^2$: | $B_2^2 \cap \{b_2\} = \{b_2\}$ |
| For task $t_1^1$: | $B_1^1 \cap \{b_2\} = \{b_2\}$ |
| For task $t_1^2$: | $B_1^2 \cap \{b_2\} = \{b_2\}$ |
| For task $t_3^1$: | $B_3^1 \cap \{b_2\} = \{b_2\}$ |
| For task $t_3^2$: | $B_3^2 \cap \{b_2\} = \{\ \}$ |
| For task $t_5^1$: | $B_5^1 \cap \{b_2\} = \{b_2\}$ |
| For task $t_5^2$: | $B_5^2 \cap \{b_2\} = \{\ \}$ |
| For task $t_4^1$: | $B_4^1 \cap \{b_2\} = \{\ \}$ |
| For task $t_4^2$: | $B_4^2 \cap \{b_2\} = \{\ \}$ |
| For task $t_6^1$: | $B_6^1 \cap \{b_2\} = \{\ \}$ |
| For task $t_6^2$: | $B_6^2 \cap \{b_2\} = \{\ \}$ |
| For task $t_6^3$: | $B_6^3 \cap \{b_2\} = \{\ \}$ |

Since the intersections for tasks $t_2^1$, $t_2^2$, $t_1^1$, $t_1^2$, $t_3^1$, $t_5^1$ became $\{b_2\}$, the tasks $t_2^1$, $t_2^2$, $t_1^1$, $t_1^2$, $t_3^1$, $t_5^1$ are executed for block $b_2$ read into the main memory.

For executing the tasks $t_2^1$, $t_2^2$, $t_1^1$, $t_1^2$, $t_3^1$, $t_5^1$, the records in the block are processed from the record of smaller record number, and for each record, some of the task operations are executed consecutively on the record in the lined up order of the tasks $t_2^1$, $t_2^2$, $t_1^1$, $t_1^2$, $t_3^1$, $t_5^1$ respectively, resulting in the following.

TABLE 2

Task operations for block $b_2$ in relation DEPARTMENT

| | | Time |
|---|---|---|
| $t_3^1$ updates | read_item(D.r6);<br>D.r6.MGRSSN := 470124116;<br>write_item(D.r6);<br>read_item(D.r7); | ↓ |
| $t_2^1$ updates | D.r7.BUDGET := D.r7.BUDGET + 22000; | |
| $t_2^2$ updates | D.r7.BUDGET := D.r7.BUDGET + 30000; | |
| $t_1^1$ updates | D.r7.BUDGET := D.r7.BUDGET + 10000; | |
| $t_5^1$ updates | D.r7.BUDGET := D.r7.BUDGET − 24000;<br>write_item(D.r7);<br>read_item(D.r8); | |
| $t_2^2$ updates | D.r8.BUDGET := D.r8.BUDGET + 30000; | |
| $t_5^1$ updates | D.r8.BUDGET := D.r8.BUDGET − 24000;<br>write_item(D.r8);<br>read_item(D.r9); | |
| $t_1^2$ updates | D.r9.BUDGET := D.r9.BUDGET + 20000;<br>write_item(D.r9);<br>commit($T_2$); | |

Since record D.r6 is the smallest record number in this case, the update operation of task $t_3^1$ is executed on record D.r6 first.

The update operations of tasks $t_2^1$, $t_2^2$, $t_1^1$, and $t_5^1$, which are partial operations of transactions $T_2$, $T_1$, and $T_5$, are executed consecutively on record D.r7 according to the transaction execution order $T_2$, $T_1$, $T_5$ indicated in the precedence graph of FIG. 4(a).

Task $t_2^1$ updates the value of record D.r7 read from the database;
 task $t_2^2$ updates the value of record D.r7 updated by task $t_2^1$;
 task $t_1^1$ updates the value of record D.r7 updated by task $t_2^2$ and
 task $t_5^1$ updates the value of record D.r7 updated by task $t_1^1$.

In this manner, the update operations of tasks $t_2^1$, $t_2^2$, $t_1^1$, and $t_5^1$ are executed consecutively on record D.r7 in the main memory, and only the last updated result by task $t_5^1$ is written in the database once.

The update operations of tasks $t_2^2$ and $t_5^1$, which are partial operations of transactions $T_2$ and $T_5$, are executed consecutively on record D.r8 according to the transaction execution order $T_2$, $T_5$ indicated in the precedence graph of FIG. 4(a).

Task $t_2^2$ updates the value of record D.r8 read from database; and
 task $t_5^1$ updates the value of record D.r8 updated by task $t_2^2$.

In this manner, the update operations of tasks $t_2^2$ and $t_5^1$ are executed consecutively on record D.r8 in the main memory, and only the last updated result by task $t_5^1$ is written in the database once.

For record D.r9, task $t_1^2$ updates the value of record D.r9 read from database.

Once the tasks $t_2^1$, $t_2^2$, $t_1^1$, $t_1^2$, $t_3^1$, $t_5^1$ for block $b_2$ are executed, block $b_2$ is no longer needed to be accessed again; therefore, the differences of block sets $B_2^1$, $B_2^2$, $B_1^1$, $B_1^2$, $B_3^1$, $B_5^1$ and set $\{b_2\}$ are obtained, and the obtained differences are expressed as block sets $B_2^{1(1)}$, $B_2^{2(1)}$, $B_1^{1(1)}$, $B_1^{2(1)}$, $B_3^{1(1)}$, and $B_5^{1(1)}$, respectively, resulting in the following.

| | | |
|---|---|---|
| For task $t_2^1$: | $B_2^{1(1)} \leftarrow B_2^1 - \{b_2\}$, | $B_2^{1(1)} = \{\ \}$ |
| For task $t_2^2$: | $B_2^{2(1)} \leftarrow B_2^2 - \{b_2\}$, | $B_2^{2(1)} = \{\ \}$ |
| For task $t_1^1$: | $B_1^{1(1)} \leftarrow B_1^1 - \{b_2\}$, | $B_1^{1(1)} = \{\ \}$ |
| For task $t_1^2$: | $B_1^{2(1)} \leftarrow B_1^2 - \{b_2\}$, | $B_1^{2(1)} = \{\ \}$ |
| For task $t_3^1$: | $B_3^{1(1)} \leftarrow B_3^1 - \{b_2\}$, | $B_3^{1(1)} = \{b_4\}$ |
| For task $t_5^1$: | $B_5^{1(1)} \leftarrow B_5^1 - \{b_2\}$, | $B_5^{1(1)} = \{\ \}$ |

Since block sets $B_2^{1(1)}$, $B_2^{2(1)}$, $B_1^{1(1)}$, $B_1^{2(1)}$ and $B_5^{1(1)}$ became an empty set $\{\ \}$, the execution of tasks $t_2^1$, $t_2^2$, $t_1^1$, $t_1^2$, $t_5^1$ is finished. As a result, the execution of all of the tasks in transaction $T_2$ is finished. Therefore, whether transaction $T_2$ can be committed at this time is determined based on the precedence graph of FIG. 4(a). Since vertex $T_2$ does not have any incoming edges from other vertices, transaction $T_2$ is committed. Once transaction $T_2$ is committed, vertex $T_2$ and all of the outgoing edges from vertex $T_2$ are removed from the precedence graph of FIG. 4(a). The result from this operation is shown in the precedence graph of FIG. 4(b).

Also, the edge for record D.r7 drawn from vertex $T_1$ to vertex $T_5$ is left as a dotted line edge in FIG. 4(b) because transactions $T_1$ and $T_5$ are not committed yet even though they have finished their update operations on record D.r7.

[(c-2) Accessing Block $b_4$]

Next, the data of block $b_4$ at stored location 768 in the relation DEPARTMENT is read into the main memory from the disk. In order to check if tasks $t_3^1$, $t_3^2$, $t_5^2$, $t_4^1$, $t_4^2$, $t_6^1$, $t_6^2$ and $t_6^3$ in the group, excluding tasks $t_2^1$, $t_2^2$, $t_1^1$, $t_1^2$, $t_5^1$ already executed, needs to be executed for block $b_4$, block $b_4$ is expressed as a set $\{b_4\}$, and the intersections of block sets $B_3^{1(1)}$, $B_3^2$, $B_5^2$, $B_4^1$, $B_4^2$, $B_6^1$, $B_6^2$, $B_6^3$ and set $\{b_4\}$ are obtained, resulting in the following.

| | |
|---|---|
| For task $t_3^1$: | $B_3^{1(1)} \cap \{b_4\} = \{b4\}$ |
| For task $t_3^2$: | $B_3^2 \cap \{b_4\} = \{b_4\}$ |
| For task $t_5^2$: | $B_5^2 \cap \{b_4\} = \{\ \}$ |
| For task $t_4^1$: | $B_4^1 \cap \{b_4\} = \{\ \}$ |
| For task $t_4^2$: | $B_4^2 \cap \{b_4\} = \{b_4\}$ |
| For task $t_6^1$: | $B_6^1 \cap \{b_4\} = \{\ \}$ |
| For task $t_6^2$: | $B_6^2 \cap \{b_4\} = \{\ \}$ |
| For task $t_6^3$: | $B_6^3 \cap \{b_4\} = \{\ \}$ |

Since the intersections for tasks $t_3^1$, $t_3^2$ and $t_4^2$ became $\{b_4\}$, tasks $t_3^1$, $t_3^2$ and $t_4^2$ are executed for block $b_4$, which is read into the main memory, resulting in the following.

TABLE 3

Task operations for block $b_4$ in relation DEPARTMENT

| | | Time |
|---|---|---|
| $t_3^1$ updates | read_item(D.r19);<br>D.r19.MGRSSN := 470124116;<br>D.r19.DPHONE := 23-3737; | ↓ |
| $t_4^2$ updates | write_item(D.r19);<br>commit($T_3$); | |

The update operations of tasks $t_3^1$ and $t_4^2$, which are partial operations of transactions $T_3$ and $T_4$, are executed consecutively on record D.r19 according to the transaction execution order $T_3$, $T_4$ indicated in the precedence graph of FIG. 4(b).

Task $t_3^1$ updates the value of record D.r19 read from the database; and task $t_4^2$ updates the value of record D.r19 updated by task $t_3^1$.

In this manner, the update operations of tasks $t_3^1$ and $t_4^2$ are executed consecutively on record D.r19 in the main memory, and only the last updated result by task $t_4^2$ is written in the database once.

The retrieve operation of task $t_3^2$ is to retrieve the value of record D.r19; that is, once the update operation of task $t_3^1$ contained in the same transaction $T_5$ as task $t_3^2$ is executed, the value of record D.r19 updated by task $t_3^1$ is retrieved as a retrieve result of task $t_3^2$ before executing the update operation of task $t_4^2$.

Once the tasks $t_3^1$, $t_3^2$ and $t_4^2$ for block $b_4$ are executed, block $b_4$ is no longer needed to be accessed again; therefore, the differences of block sets $B_3^{1(1)}$, $B_3^2$, $B_4^2$ and set $\{b_4\}$ are obtained and the obtained differences are expressed as block sets $B_3^{1(2)}$, $B_3^{2(1)}$, and $B_4^{2(1)}$, resulting in the following.

| | | |
|---|---|---|
| For task $t_3^1$: | $B_3^{1(2)} \leftarrow B_3^{1(1)} - \{b_4\}$, | $B_3^{1(2)} = \{\ \}$ |
| For task $t_3^2$: | $B_3^{2(1)} \leftarrow B_3^2 - \{b_4\}$, | $B_3^{2(1)} = \{\ \}$ |
| For task $t_4^2$: | $B_4^{2(1)} \leftarrow B_4^2 - \{b_4\}$, | $B_4^{2(1)} = \{\ \}$ |

Since block sets $B_3^{1(2)}$, $B_3^{2(1)}$ and $B_4^{2(1)}$ became empty sets ({ }), the execution of tasks $t_3^1$, $t_3^2$ and $t_4^2$ is finished. As a result, the execution of all of the tasks contained in transaction $T_3$ is finished. Therefore, whether transaction $T_3$ can be committed at this time is determined based on the precedence graph of FIG. 4(b). Since vertex $T_3$ does not have any incoming edges from other vertices, transaction $T_3$ is committed.

Once transaction $T_3$ is committed, vertex $T_3$ and all of the outgoing edges from vertex $T_3$ are removed from the precedence graph of FIG. 4(b). The result of this operation is shown in the precedence graph of FIG. 4(c).

[(c-3) Reading Block $b_3$]

Next, the data of block $b_3$ at stored location 512 in the relation DEPARTMENT is read into the main memory from the disk. In order to check if tasks $t_5^2$, $t_4^1$, $t_6^1$, $t_6^2$ and $t_6^3$ in the group, excluding tasks $t_2^1$, $t_2^2$, $t_1^1$, $t_1^2$, $t_3^1$, $t_3^2$, $t_5^1$ and $t_4^2$ already executed, need to be executed for block $b_3$, block $b_3$ is expressed as a set $\{b_3\}$, and the intersections of block sets $B_5^2$, $B_4^1$, $B_6^1$, $B_6^2$, $B_6^3$ and set $\{b_3\}$ are obtained, resulting in the following.

| | |
|---|---|
| For task $t_5^2$: | $B_5^2 \cap \{b_3\} = \{b_3\}$ |
| For task $t_4^1$: | $B_4^1 \cap \{b_3\} = \{\ \}$ |
| For task $t_6^1$: | $B_6^1 \cap \{b_3\} = \{b_3\}$ |
| For task $t_6^2$: | $B_6^2 \cap \{b_3\} = \{\ \}$ |
| For task $t_6^3$: | $B_6^3 \cap \{b_3\} = \{\ \}$ |

Since the intersections for tasks $t_5^2$ and $t_6^1$ became $\{b_3\}$, tasks $t_5^2$ and $t_6^1$ are executed for block $b_3$, which is read into the main memory, resulting in the following.

TABLE 4

Task operations for block $b_3$ in relation DEPARTMENT

| | | Time |
|---|---|---|
| $t_5^2$ updates | read_item(D.r14);<br>D.r14.BUDGET := D.r14.BUDGET − 11000; | ↓ |
| $t_6^1$ updates | D.r14.BUDGET := D.r14.BUDGET − 15000;<br>write_item(D.r14); | |

The update operations of tasks $t_5^2$ and $t_6^1$, which are partial operations of transactions $T_5$ and $T_6$, are executed consecutively on record D.r14 according to the transaction execution order $T_5$, $T_6$ indicated in the precedence graph of FIG. 4(c).

Task $t_5^2$ updates the value of record D.r14 read from the database; and task $t_6^1$ updates the value of record D.r14 updated by task $t_5^2$.

In this manner, the update operations of tasks $t_5^2$ and $t_6^1$ are executed consecutively on record D.r14 in the main memory, and only the last updated result by task $t_6^1$ is written in the database once.

Once the tasks $t_5^2$ and $t_6^1$ for block $b_3$ are executed, block $b_3$ is no longer needed to be accessed again; therefore, the differences of block sets $B_5^2$, $B_6^1$ and set $\{b_3\}$ are obtained, and the obtained differences are expressed as block sets $B_5^{2(1)}$ and $B_6^{1(1)}$, resulting in the following.

| | | |
|---|---|---|
| For task $t_5^2$: | $B_5^{2(1)} \leftarrow B_5^2 - \{b_3\}$, | $B_5^{2(1)} = \{\ \}$ |
| For task $t_6^1$: | $B_6^{1(1)} \leftarrow B_6^1 - \{b_3\}$, | $B_6^{1(1)} = \{b_1\}$ |

Since block set $B_5^{2(1)}$ became an empty set ({ }), the execution of task $t_5^2$ is finished.

Once the execution of task $t_5^2$ is finished, the execution of all of the tasks in transaction $T_5$ is finished; therefore, whether transaction $T_5$ can be committed at this time is determined based on the precedence graph of FIG. 4(c).

Since transaction $T_5$ updated the value of record D.r7 previously updated by uncommitted transaction $T_1$, transaction $T_5$ cannot be committed yet. Therefore, transaction $T_5$ is left as a commit-waiting transaction.

A non-committing state of transaction $T_5$ is shown as a dotted line vertex $T_5$ in the precedence graph of FIG. 4(d) even though the execution of transaction $T_5$ is finished.

Also, the edge for record D.r14 drawn from vertex $T_5$ to vertex $T_6$ is left as a dotted line edge in the precedence graph of FIG. 4(d) because transactions $T_5$ and $T_6$ are not committed yet even though they have finished their update operations on record D.r14.

[(c-4) Accessing Block $b_1$]

Next, the data of block $b_1$ at stored location 0 in the relation DEPARTMENT is read into the main memory from the disk. In order to check if tasks $t_4^1$, $t_6^1$, $t_6^2$ and $t_6^3$ in group G1, excluding tasks $t_2^1$, $t_2^2$, $t_1^1$, $t_1^2$, $t_3^1$, $t_3^2$, $t_5^1$, $t_5^2$, and $t_4^2$ already executed, need to be executed for block $b_1$, block $b_1$ is expressed as a set $\{b_1\}$, and the intersections ($\cap$) of block sets $B_4^1$, $B_6^{1(1)}$, $B_6^2$, $B_6^3$ and set $\{b_1\}$ are obtained, resulting in the following.

| For task $t_4^1$: | $B_4^1 \cap \{b1\} = \{b_1\}$ |
|---|---|
| For task $t_6^1$: | $B_6^{1(1)} \cap \{b_1\} = \{b_1\}$ |
| For task $t_6^2$: | $B_6^2 \cap \{b_1\} = \{\ \}$ |
| For task $t_6^3$: | $B_6^3 \cap \{b_1\} = \{\ \}$ |

Since the intersections for tasks $t_4^1$ and $t_6^1$ became $\{b_1\}$, tasks $t_4^1$ and $t_6^1$ are executed for block $b_1$, which is read into the main memory, resulting in the following.

TABLE 5

Task operations for block $b_1$ in relation DEPARTMENT

| | read_item(D.r3); | Time |
|---|---|---|
| $t_4^1$ updates | D.r3.DPHONE := 23-3736; | ↓ |
| $t_6^1$ updates | D.r3.BUDGET := D.r3.BUDGET-15000; write_item(D.r3); | |

The update operations of tasks $t_4^1$ and $t_6^1$, which are partial operations of transactions $T_4$ and $T_6$, are executed consecutively on record D.r3 according to the transaction execution order $T_4$, $T_6$ indicated in the precedence graph of FIG. 4(d).

Task $t_4^1$ updates the value of record D.r3 read from the database; and task $t_6^1$ updates the value of record D.r3 updated by task $t_4^1$.

In this manner, the update operations of tasks $t_4^1$ and $t_6^1$ are executed consecutively on record D.r3 in the main memory, and only the last updated result by task $t_6^1$ is written in the database once.

Once the tasks $t_4^1$ and $t_6^1$ for block $b_1$ is executed, block $b_1$ is no longer needed to be accessed again; therefore, the differences of block sets $B_4^1$, $B_6^{1(1)}$ and set $\{b_1\}$ are obtained, and the obtained differences are expressed as block sets $B_4^{1(1)}$ and $B_6^{1(2)}$, resulting in the following.

| For task $t_4^1$: | $B_4^{1(1)} \leftarrow B_4^1 - \{b_1\}$, | $B_4^{1(1)} = \{\ \}$ |
|---|---|---|
| For task $t_6^1$: | $B_6^{1(2)} \leftarrow B_6^{1(1)} - \{b_1\}$, | $B_6^{1(2)} = \{\ \}$ |

Since block sets $B_4^{1(1)}$ and $B_6^{1(2)}$ became empty sets ($\{\ \}$), the execution of tasks $t_4^1$ and $t_6^1$ is finished.

Also, the edge for record D.r3 drawn from vertex $T_4$ to vertex $T_6$ is left as a dotted line edge in FIG. 4(e) because transactions $T_4$ and $T_6$ are not committed yet even though they have finished their update operations on record D.r3.

[(c-5) Reading Block $b_5$]

Finally, the data of block $b_5$ at stored location 1024 in the relation DEPARTMENT is read into the main memory from the disk, and the operations of the last tasks $t_6^2$ and $t_6^3$ in group G1 are executed consecutively on block $b_5$, resulting in the following.

TABLE 6

Task operations for block $b_5$ in relation DEPARTMENT

| | read_item(D.r22); | Time |
|---|---|---|
| $t_6^2$ updates | D.r22.MGRSSN := 433424659; write_item(D.r22); | ↓ |
| $t_6^3$ retrieves | read_item(D.r23); | |

Task $t_6^2$ updates the value of record D.r22 read from the database.

Task $t_6^3$ retrieves the value of record D.r23 read from the database.

Once the execution of tasks $t_6^2$ and $t_6^3$ is finished, the execution of all of the tasks in transaction $T_6$ is finished. Thus, whether transaction $T_6$ can be committed at this time is determined based on the precedence graph shown in FIG. 4(e).

Since transaction $T_6$ updated the value of record D.r14 previously updated by uncommitted transaction $T_5$ and also updated the value of record D.r3 previously updated by uncommitted transaction $T_4$, transaction $T_6$ cannot be committed. Therefore, transaction $T_6$ is left as a commit-waiting transaction.

A non-committing state of transaction $T_6$ is shown as a dotted line vertex $T_6$ in the precedence graph of FIG. 4(f) even though the execution of transaction $T_6$ is finished.

Once the execution of tasks $t_6^2$ and $t_6^3$ is finished, the execution of all of the tasks in group G1 is finished.

Once the execution of group G1 is finished, execution of group G2 contained in synthetic transaction $T_{G1,G2}$ is started next.

[(5-2) Executing Group G2]

Similar to the execution of group G1, the execution of group G2 for the relation EMPLOYEE is performed using multi-operation processing.

[(a) Obtaining Block Sets to be Accessed by Tasks]

By using the primary index (410) and the secondary index (420) of the relation EMPLOYEE (400) shown in FIG. 3-2, the blocks in the relation EMPLOYEE (400) that need to be read for executing the tasks $t_7^1$, $t_1^3$, $t_5^1$ and $t_4^3$ are located and collected into corresponding block sets $B_7^1$, $B_1^3$, $B_8^1$ and $B_4^3$ respectively, resulting in the following.

| For task $t_7^1$: | $B_7^1 = \{b_2\}$ |
|---|---|
| For task $t_1^3$: | $B_1^3 = \{b_4\}$ |
| For task $t_8^1$: | $B_8^1 = \{b_2, b_3\}$ |
| For task $t_4^3$: | $B_4^3 = \{b_3\}$ |

[(b) Determining a Block Access Order]

Once the block sets are obtained, the union of the block sets corresponding to the respective tasks in the group is obtained in the lined up order of the tasks in the group, that is, in the order of tasks $t_7^1$, $t_1^3$, $t_8^1$, $t_4^3$ respectively, resulting in the following.

| | $TB_0 \leftarrow \{\ \}$ (empty set) |
|---|---|
| Union with block set $B_7^1$: | $TB_7^1 \leftarrow TB_0 \cup B_7^1$, $TB_7^1 = \{b_2\}$ |
| Union with block set $B_1^3$: | $TB_1^3 \leftarrow TB_7^1 \cup B_1^3$, $TB_1^3 = \{b_2, b_4\}$ |
| Union with block set $B_8^1$: | $TB_8^1 \leftarrow TB_1^3 \cup B_8^1$, $TB_8^1 = \{b_2, b_4, b_3\}$ |
| Union with block set $B_4^3$: | $TB_4^3 \leftarrow TB_8^1 \cup B_4^3$, $TB_4^3 = \{b_2, b_4, b_3\}$ |

By obtaining the union of the block sets consecutively as above, the block access can begin at block $b_2$ and end at block $b_3$ in the relation EMPLOYEE from the last obtained union $TB_4^3$. Thus, the block access order is determined as ($b_2$, $b_4$, $b_3$).

[(c) Task Executions for Each Block]
[(c-1) Accessing Block $b_2$]

First, the data of block $b_2$ at stored location 256 in the relation EMPLOYEE (400) is read into the main memory from the disk. In order to check if tasks $t_7^1$, $t_1^3$, $t_8^1$ and $t_4^3$ in the group need to be executed for block $b_2$, block $b_2$ is expressed as a set $\{b_2\}$, and the intersections of block sets $B_7^1$, $B_1^3$, $B_8^1$, $B_4^3$ and set $\{b_2\}$ are obtained, resulting in the following.

| For task $t_7^1$: | $B_7^1 \cap \{b_2\} = \{b_2\}$ |
|---|---|
| For task $t_1^3$: | $B_1^3 \cap \{b_2\} = \{\ \}$ |
| For task $t_8^1$: | $B_8^1 \cap \{b_2\} = \{b_2\}$ |
| For task $t_4^3$: | $B_4^3 \cap \{b_2\} = \{\ \}$ |

Since the intersections for tasks $t_7^1$ and $t_8^1$ became $\{b_2\}$, tasks $t_7^1$ and $t_8^1$ are executed for block $b_2$, which is read into the main memory, resulting in the following.

TABLE 7

Task operations for block $b_2$ in relation EMPLOYEE

| $t_7^1$ updates<br>$t_8^1$ updates | read_item(E.r6);<br>E.r6.BDATE := 'DEC-27-1971';<br>E.r6.DNUM :=7;<br>write_item(E.r6);<br>commit($T_7$); | Time<br>↓ |
|---|---|---|

The update operations of tasks $t_7^1$ and $t_8^1$, which are partial operations of transactions $T_7$ and $T_8$, are executed consecutively on record E.r6 according to the transaction execution order $T_7$, $T_8$ indicated in the precedence graph of FIG. 4(f).

Task $t_7^1$ updates the value of record E.r6 read from the database, and task $t_8^1$ updates the value of record E.r6 updated by task $t_7^1$.

In this manner, the update operations of tasks $t_7^1$ and $t_8^1$ are executed consecutively on record E.r6 in the main memory, and only the last updated result by task $t_8^1$ is written in the database once.

Once tasks $t_7^1$ and $t_8^1$ for block $b_2$ are executed, block $b_2$ is no longer needed to be accessed again; therefore, the differences of block sets $B_7^1$, $B_8^1$ and set $\{b_2\}$ are obtained, and the obtained differences are expressed as block sets $B_7^{1(1)}$ and $B_8^{1(1)}$, resulting in the following.

| For task $t_7^1$: | $B_7^{1(1)} \leftarrow B_7^1 - \{b_2\}$, | $B_7^{1(1)} = \{\ \}$ |
|---|---|---|
| For task $t_8^1$: | $B_8^{1(1)} \leftarrow B_8^1 - \{b_2\}$, | $B_8^{1(1)} = \{b_3\}$ |

Since block set $B_7^{1(1)}$ became an empty set($\{\ \}$), the execution of task $t_7^1$ is finished. Once the execution of task $t_7^1$ is finished, the execution of all of the tasks in transaction $T_7$ is finished. Therefore, whether transaction $T_7$ can be committed at this time is determined based on the precedence graph of FIG. 4(f). Since vertex $T_7$ does not have any incoming edges from other vertices, transaction $T_7$ is committed.

Once transaction $T_7$ is committed, vertex $T_7$ and all of the outgoing edges from vertex $T_7$ are removed from the precedence graph of FIG. 4(f). The result of this operation is shown in the precedence graph of FIG. 4(g).

[(c-2) Reading Block $b_4$]

Next, the data of block $b_4$ at stored location 768 in the relation EMPLOYEE (400) is read into the main memory from the disk. In order to check if tasks $t_8^1$, $t_1^3$ and $t_4^3$ in the group, excluding task $t_7^1$ already executed, need to be executed for block $b_4$, block $b_4$ is expressed as a set $\{b_4\}$, and the intersections of block sets $B_8^{1(1)}$, $B_1^3$, $B_4^3$ and set $\{b_4\}$ are obtained respectively, resulting in the following.

| For task $t_8^1$: | $B_8^{1(1)} \cap \{b_4\} = \{\ \}$ |
|---|---|
| For task $t_1^3$: | $B_1^3 \cap \{b_4\} = \{b_4\}$ |
| For task $t_4^3$: | $B_4^3 \cap \{b_4\} = \{\ \}$ |

Since the intersection for task $t_1^3$ became $\{b_4\}$, the update operation of task $t_1^3$ is executed for block $b_4$, which is read into the main memory, resulting in the following.

TABLE 8

Task operation for block $b_4$ in relation EMPLOYEE

| $t_1^3$ updates | read_item(E.r14);<br>E.r14.DNUM := 4;<br>write_item(E.r14);<br>commit($T_1$);<br>commit($T_5$); | Time<br>↓ |
|---|---|---|

Once task $t_1^3$ for block $b_4$ is executed, block $b_4$ is no longer needed to be accessed again. Therefore, the difference of block set $B_1^3$ and set $\{b_4\}$ is obtained, and the obtained difference is expressed as a block set $B_1^{3(1)}$, resulting in the following.

For task $t_1^3$: $B_1^{3(1)} \leftarrow B_1^3 - \{b_4\}$, $B_1^{3(1)} = \{\ \}$ Since block set $B_1^{3(1)}$ became an empty set, the execution of task $t_1^3$ is finished.

Once the execution of task $t_1^3$ is finished, the execution of all of the tasks in transaction $T_1$ is finished. Therefore, whether transaction $T_1$ can be committed at this time is determined based on the precedence graph of FIG. 4(g).

Since vertex $T_1$ does not have any incoming edges from other vertices, transaction $T_1$ is committed.

Once transaction $T_1$ is committed, vertex $T_1$ and all of the outgoing edges from the vertex $T_1$ are removed from the precedence graph of FIG. 4(g).

Once, vertex $T_1$ is removed, the edge drawn from vertex $T_1$ to vertex $T_5$ is removed, causing vertex $T_5$ to lose all of its incoming edges. Therefore, transaction $T_5$ is also committed. The result of committing transactions $T_1$ and $T_5$ is shown in the precedence graph of FIG. 4(h).

[(c-3) Accessing Block $b_3$]

Finally, the data of block $b_3$ at stored location 512 in the relation EMPLOYEE is read into the main memory from the disk, and remaining tasks $t_8^1$ and $t_4^3$ in group G2 are executed for block $b_3$, resulting in the following.

TABLE 9

Task operations for block $b_3$ in relation EMPLOYEE

| $t_8^1$ updates<br>$t_4^3$ updates | read_item(E.r10);<br>E.r10.DNUM := 7;<br>E.r10.BDATE := 'DEC-27-1971';<br>write_item(E.r10);<br>commit($T_8$);<br>commit($T_4$);<br>commit($T_6$); | Time<br>↓ |
|---|---|---|

The update operations of tasks $t_8^1$ and $t_4^3$, which are partial operations of transactions $T_8$ and $T_4$, are executed consecutively on record E.r10 in the transaction execution order $T_8$, $T_4$ indicated in the precedence graph of FIG. 4(h).

Task $t_8^1$ updates the value of record E.r10 read from database, and task $t_4^3$ updates the value of record E.r10 updated by task $t_8^1$.

In this manner, the update operations of tasks $t_8^1$ and $t_4^3$ are executed consecutively on record E.r10 in the main memory, and only the last updated result by task $t_4^3$ is written in the database once.

Once the execution of tasks $t_8^1$ and $t_4^3$ is finished, the execution of all of the tasks in transactions $T_8$ and $T_4$ is finished. At this time, vertex $T_8$ does not have any incoming edges; therefore, transaction $T_8$ is committed, and subsequently transaction $T_4$ is also committed.

Once vertices $T_8$ and $T_4$ are removed from the precedence graph of FIG. 4(h), the edge drawn from vertex $T_4$ to vertex $T_6$ is also removed, causing vertex $T_6$ to lose all of its incoming edges; therefore, transaction $T_6$ is also committed (FIG. 4(i)).

As a result, all of the submitted transactions are committed in the order of $T_2$, $T_3$, $T_7$, $T_1$, $T_5$, $T_8$, $T_4$, $T_6$.

The following Table 10 gives a summary of the above. For executing group G1 for the relation DEPARTMENT (300):

tasks $t_2^1$, $t_2^2$, $t_1^1$, $t_1^2$, $t_3^1$ and $t_5^1$ are executed for block $b_2$, and transaction $T_2$ is ended and committed;

tasks $t_3^1$, $t_3^2$ and $t_4^2$ are executed for block $b_4$, and transaction $T_3$ is ended and committed;

tasks $t_5^2$ and $t_6^1$ are executed for block $b_3$, and transaction $T_5$ is ended;

tasks $t_4^1$ and $t_6^1$ are executed for block $b_1$; and tasks $t_6^2$ and $t_6^3$ are executed for block $b_5$, and transaction $T_6$ is ended.

For executing group G2 for the relation EMPLOYEE (400):

tasks $t_7^1$ and $t_8^1$ are executed for block $b_2$, and transaction $T_7$ is ended and committed;

task $t_1^3$ is executed for block $b_4$, and transaction $T_1$ is ended and transactions $T_1$ and $T_5$ are committed; and tasks $t_8^1$ and $t_4^3$ are executed for block $b_3$, transactions $T_8$ and $T_4$ are ended, and transactions $T_8$, $T_4$ and $T_6$ are committed.

TABLE 10

| RELATION | BLOCK | TASK | END | COMMIT |
|---|---|---|---|---|
| DEPARTMENT | $b_2$ | $t_2^1, t_2^2, t_1^1, t_1^2, t_3^1, t_5^1$ | $T_2$ | $T_2$ |
| DEPARTMENT | $b_4$ | $t_3^1, t_3^2, t_4^2$ | $T_3$ | $T_3$ |
| DEPARTMENT | $b_3$ | $t_5^2, t_6^1$ | $T_5$ | |
| DEPARTMENT | $b_1$ | $t_4^1, t_6^1$ | | |
| DEPARTMENT | $b_5$ | $t_6^2, t_6^3$ | $T_6$ | |
| EMPLOYEE | $b_2$ | $t_7^1, t_8^1$ | $T_7$ | $T_7$ |
| EMPLOYEE | $b_4$ | $t_1^3$ | $T_1$ | $T_1, T_5$ |
| EMPLOYEE | $b_3$ | $t_8^1, t_4^3$ | $T_8, T_4$ | $T_8, T_4, T_6$ |

In this manner, the multiple submitted transactions are executed concurrently, and the transactions are ended and they are committed in the order of $T_2$, $T_3$, $T_7$, $T_1$, $T_5$, $T_8$, $T_4$, $T_6$. The order in which the transactions are committed is a little different from the transaction execution order determined at the beginning; however, both of these orders can be derived from the precedence graph of FIG. 4(a) not containing any cycle in topological sort order. Therefore, this method provides a serializable schedule which is conflict equivalent to the transaction execution order determined at the beginning.

As shown above, the transaction processing system of database using multi-operation processing providing concurrency control of transactions is a method that determines a transaction execution order for multiple transactions which can be executed concurrently, creates a precedence graph indicating to update data in the determined transaction execution order, retrieves partial operations contained in the transactions as tasks, collects the retrieved tasks into groups for each database relation in the transaction execution order, creates a synthetic transaction using the groups created by grouping, and executes each group contained in the synthetic transaction using multi-operation processing.

In the example described above, records to be processed by a plurality of transactions are treated as data items. However, if records are treated as data items, when a large number of records are processed, the stored location of each record is found and an enormous precedence graph needs to be created.

Therefore, a precedence graph may be created for blocks by finding only stored locations of the blocks containing records and treating the blocks as data items. In this case, if a block being accessed exists in the precedence graph, the operations of the tasks in the group are executed consecutively on the block.

Also, in the example described above, the transactions including basic update operations such as read and write operations have been dealt with. However, insert and delete operations are also performed in the actual update operations.

In order to insert data using multi-operation processing, stored location of a block to insert the data is located, and if the block is found and has enough free space, the data is inserted to the block when the block is accessed in the block access order.

Also, in order to delete data using multi-operation processing, stored location of a block including the data to be deleted is located, and if the block is found, the data is deleted from the block when the block is accessed in the block access order.

Since each group contained in a synthetic transaction is executed for a different relation, even if the multiple groups contained in the synthetic transaction are executed concurrently, the same data items are not accessed simultaneously by the multiple groups.

Also, since the task operations, which are partial operations of the transactions, are executed consecutively on a data item in the block, which is read into the main memory, according to the transaction execution order indicated in the precedence graph, locks are not required by each transaction contained in the synthetic transaction. Therefore, problems such as making transactions wait and aborting transactions do not occur.

With the transaction processing system of database using multi-operation processing providing concurrency control of transactions according to the present invention, if a large number of transactions are submitted, a synthetic transaction may be created for these transactions and then executed by the technique described in Section 1.1; once the single synthetic transaction is executed, if a large number of new transactions are submitted, another synthetic transaction may be created for these transactions and then executed by the same technique. Therefore, locks are not required when synthetic transactions are executed serially. Moreover, the multiple groups contained in a synthetic transaction are executed concurrently without causing any deadlocks.

Such processing allows significant improvement in the speed of executing multiple transactions. However, there are cases where multiple synthetic transactions should be executed concurrently through assistance of processes (104) of the operating system of FIG. 1 so as to efficiently utilize CPU and disk resources (105).

Therefore, a system for executing multiple synthetic transactions concurrently is proposed in Section 2.

2. Processing Multiple Synthetic Transactions

When new transactions arrive while processing a synthetic transaction, another synthetic transaction is created for the newly arrived transactions. Then, if the new synthetic transaction is executed concurrently with the current synthetic transaction, there is a possibility that data inconsistency may occur between these synthetic transactions.

For example, if new transactions $T_9$, $T_{10}$ and $T_{11}$ arrive to the transaction processing system (100) while processing synthetic transaction $T_{G1,G2}$, a synthetic transaction $T_{G3,G4,G5}$ is created for the transactions $T_9$, $T_{10}$ and $T_{11}$.

If the multi-operation processor (102) is currently processing synthetic transaction $T_{G1,G2}$ using process 1 and process 2, the remaining process 3, process 4 and process 5 are used to process the synthetic transaction $T_{G3,G4,G5}$.

Then if both synthetic transaction $T_{G1,G2}$ and synthetic transaction $T_{G3,G4,G5}$ need to process the same data item, the same data item may be updated simultaneously so that a data inconsistency may occur.

Therefore, in order to solve the problem of multiple synthetic transactions competing for the same data item and causing a data inconsistency to occur, the multi-operation processing using two-phase locking and the multi-operation processing using timestamps are proposed.

<Multi-Operation Processing Using Two-Phase Locking>

Multi-operation processing using two-phase locking is a method that added two-phase locking technique to multi-operation processing providing concurrency control of transactions for locking data items which are processed by synthetic transactions.

In this method, lock operations are divided into two phases: a growing phase of only acquiring new locks on data items; and a shrinking phase of only releasing existing locks. Thus, a lock cannot be acquired once a lock is released.

In acquiring locks, shared locks are used for data items to be retrieved only, and exclusive locks are used for data items to be updated.

In order to avoid any data inconsistency to occur between multiple synthetic transactions, each synthetic transaction needs to be executed with multi-operation processing using two-phase locking.

The difference of multi-operation processing using two-phase locking from the conventional two-phase locking protocol is that locks are acquired by multiple synthetic transactions, which perform the multi-operation processing, instead of the conventional multiple transactions. Moreover, each synthetic transaction does not commit by itself, but each transaction contained in the synthetic transaction is committed consecutively.

Furthermore, the approach of dealing with a deadlock caused by multiple synthetic transactions is different from the conventional approach of dealing with a deadlock. If a deadlock is caused by multiple synthetic transactions, one of the synthetic transactions causing the deadlock is aborted by aborting the synthetic transaction having the lowest number of committed transactions.

In order to abort the synthetic transaction, the already committed transactions contained in the synthetic transaction are kept intact and only the uncommitted transactions contained in the synthetic transaction are aborted, rolled back, and resubmitted to the transaction processing system (100).

<Example of Multi-Operation Processing Using Two-Phase Locking>

Figures 1, 5:

In FIG. 5-1 and FIG. 5-2, two synthetic transactions $T_{G1,G2}$ and $T_{G3,G4,G5}$ are concurrently executed through multi-operation processing using two-phase locking.

$T_{G1,G2}$ is a synthetic transaction to perform its operation for the two relations DEPARTMENT (300) and EMPLOYEE (400), which is used as an example in Section 1.2.

$T_{G3,G4,G5}$ is a synthetic transaction to perform its operation for the three relations PROJECT, EMPLOYEE, and DEPARTMENT, which is created from new transactions $T_9$, $T_{10}$ and $T_{11}$ submitted to the transaction processing system (100) of FIG. 1.

In FIG. 5-1 and FIG. 5.2, an operation of acquiring a shared lock on record r is expressed as read_lock(r), an operation of acquiring an exclusive lock on record r is expressed as write_lock(r), and an operation of releasing a lock from record r is expressed as unlock(r). Also a record in the relation DEPARTMENT (300) is expressed as D.ri, a record in the relation EMPLOYEE (400) is expressed as E.ri, and a record in the relation PROJECT (omitted from the diagram) is expressed as P.ri.

In FIG. 5-1 and FIG. 5.2, synthetic transaction $T_{G1,G2}$ locks the records in the order of D.r6, D.r7, D.r8, D.r9, D.r19, D.r14, D.r3, D.r22, D.r23, E.r6, E.r14, E.r10 over time. Once all of the locks are acquired, the locks are released in the order starting from the record which has finished processing using multi-operation processing.

Similarly, synthetic transaction $T_{G3,G4,G5}$ locks the records in the order of P.r9, P.r18, E.r11, E.r21, D.r13, D.r14, D.r15, D.r19 over time. Once all of the locks are acquired, the locks are released in the order from the record which has finished processing using multi-operation processing.

The transactions contained in synthetic transactions $T_{G1,G2}$ and $T_{G3,G4,G5}$ are committed in the order of $T_2$, $T_9$, $T_3$, $T_{11}$, $T_{10}$, $T_7$, $T_1$, $T_5$, $T_8$, $T_4$, $T_6$.

Figure 6:
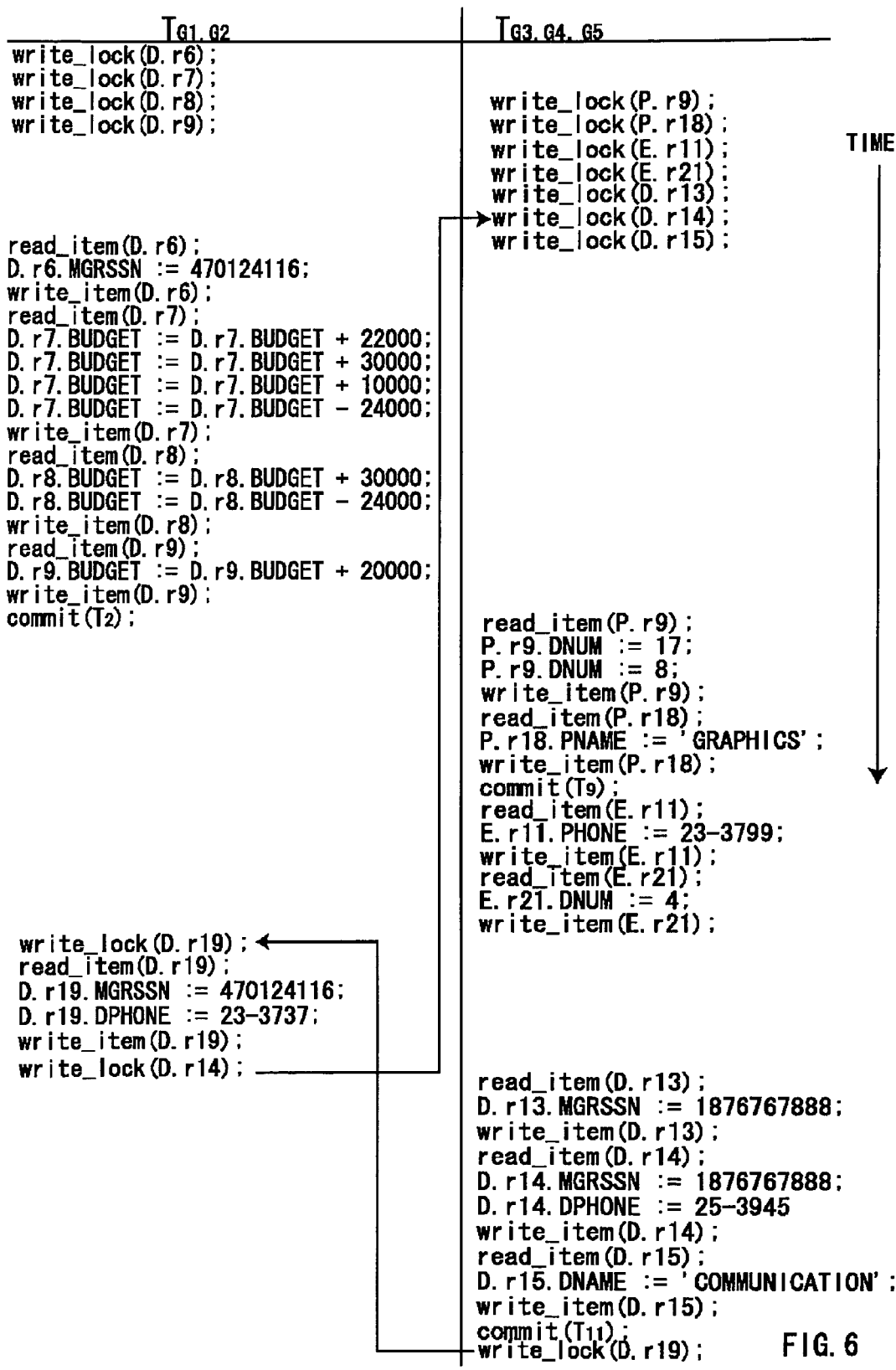
FIG. 6 is a diagram showing an exemplary deadlock caused by multiple synthetic transactions.

In multi-operation processing using two-phase locking, a deadlock may occur depending on locking order. For example, in FIG. 6, synthetic transaction $T_{G1,G2}$ tries to lock record D.r14 and synthetic transaction $T_{G3,G4,G5}$ tries to lock record D.19; however, they have already locked the records required by each other, thus causing a deadlock.

In order to remove the deadlock, either synthetic transaction $T_{G1,G2}$ or synthetic transaction $T_{G3,G4,G5}$ needs to be aborted. Since synthetic transaction $T_{G1,G2}$ has one committed transaction $T_2$ and synthetic transaction $T_{G3,G4,G5}$ has two committed transactions $T_{11}$ and $T_9$, synthetic transaction $T_{G1,G2}$ having fewer number of committed transactions is aborted.

In order to abort synthetic transaction $T_{G1,G2}$, the already committed transaction $T_2$ is left intact and only the uncommitted transactions $T_7$, $T_3$, $T_1$, $T_5$, $T_8$, $T_4$ and $T_6$ are aborted, rolled back, and resubmitted to the transaction processing system(100).

By executing each synthetic transaction through multi-operation processing using two-phase locking in this manner, the same data items are not updated simultaneously by multiple synthetic transactions so that data inconsistency does not occur.

<Multi-Operation Processing Using Timestamps>

For executing multiple synthetic transactions, multi-operation processing using timestamps assigns a timestamp to each synthetic transaction and executes the multiple synthetic transactions in the order from the synthetic transaction with smaller timestamp.

The differences of multi-operation processing using timestamps from the conventional timestamp protocol are: a timestamp is assigned to each synthetic transaction instead of each transaction; and a timestamp is assigned to each data item processed by synthetic transactions instead of assigning a timestamp to each data item processed by transactions.

Furthermore, when a data inconsistency has occurred between multiple synthetic transactions, the synthetic transaction causing the data inconsistency is aborted.

In order to abort a synthetic transaction, the already committed transactions contained in the synthetic transaction are left intact and only the uncommitted transactions contained in the synthetic transaction are aborted, rolled back, and resubmitted to the transaction processing system.

<Steps of Multi-Operation Processing Using Timestamps>

Multi-operation processing using timestamps assigns a read timestamp read_TS(X) and a write timestamp write_TS(X) to data item X which is processed by multiple synthetic transactions.

The read_TS(X) is the largest timestamp among all of the synthetic transactions that have successfully read data item X.

The write_TS(X) is the largest timestamp among all of the synthetic transactions that have successfully written data item X.

A timestamp for the synthetic transaction $T_{G1, G2, \ldots, Gn}$ is expressed as $TS(T_{G1, G2, \ldots, Gn})$, which is obtained by assigning a timestamp (arrival time) to each transaction contained in the synthetic transaction and selecting the largest timestamp among all of the transactions that received respective timestamps.

When the synthetic transaction $T_{G1, G2, \ldots, Gn}$ performs a read operation read_item(X) or a write operation write_item(X) on data item X, the following rules shall be used to execute $T_{G1, G2, \ldots, Gn}$.

Case 1: Write Operation on Data Item X:

Synthetic transaction $T_{G1, G2, \ldots, Gn}$ requesting a write operation write_item(X) for data item X (a) If read_TS(X)>TS(TG1, G2, ..., Gn) or write_TS(X)>TS($T_{G1, G2, \ldots, Gn}$), abort synthetic transaction $T_{G1, G2, \ldots, Gn}$ by aborting all of the uncommitted transactions contained in $T_{G1, G2, \ldots, Gn}$. The aborted transactions are rolled back and resubmitted to the transaction processing system.

(b) If the condition of part (a) is not satisfied, execute write_item(X) of synthetic transaction $T_{G1, G2, \ldots, Gn}$ and set the value of write_TS(X) to TS($T_{G1, G2, \ldots, Gn}$).

Case 2: Read Operation on Data Item X:

Synthetic transaction $T_{G1, G2, \ldots, Gn}$ requesting a read operation read_item(X) for data item X (a) If write_TS(X)>TS($T_{G1, G2, \ldots, Gn}$), abort synthetic transaction $T_{G1, G2, \ldots, Gn}$ by aborting all of the uncommitted transactions contained in $T_{G1, G2, \ldots, Gn}$. The aborted transactions are rolled back and resubmitted to the transaction processing system.

(b) If write_TS(X)≦TS($T_{G1, G2, \ldots, Gn}$), execute read_item(X) of $T_{G1, G2, \ldots, Gn}$, and set the value of read_TS(X) to TS($T_{G1, G2, \ldots, Gn}$) if the value of TS($T_{G1, G2, \ldots, Gn}$) is larger than read_TS(X).

Next, based on these rules, concurrent execution of synthetic transactions $T_{G1,G2}$ and $T_{G3,G4,G5}$ is described by using multi-operation processing using timestamps.

<Example of Multi-Operation Processing Using Timestamps>

Figure 7:
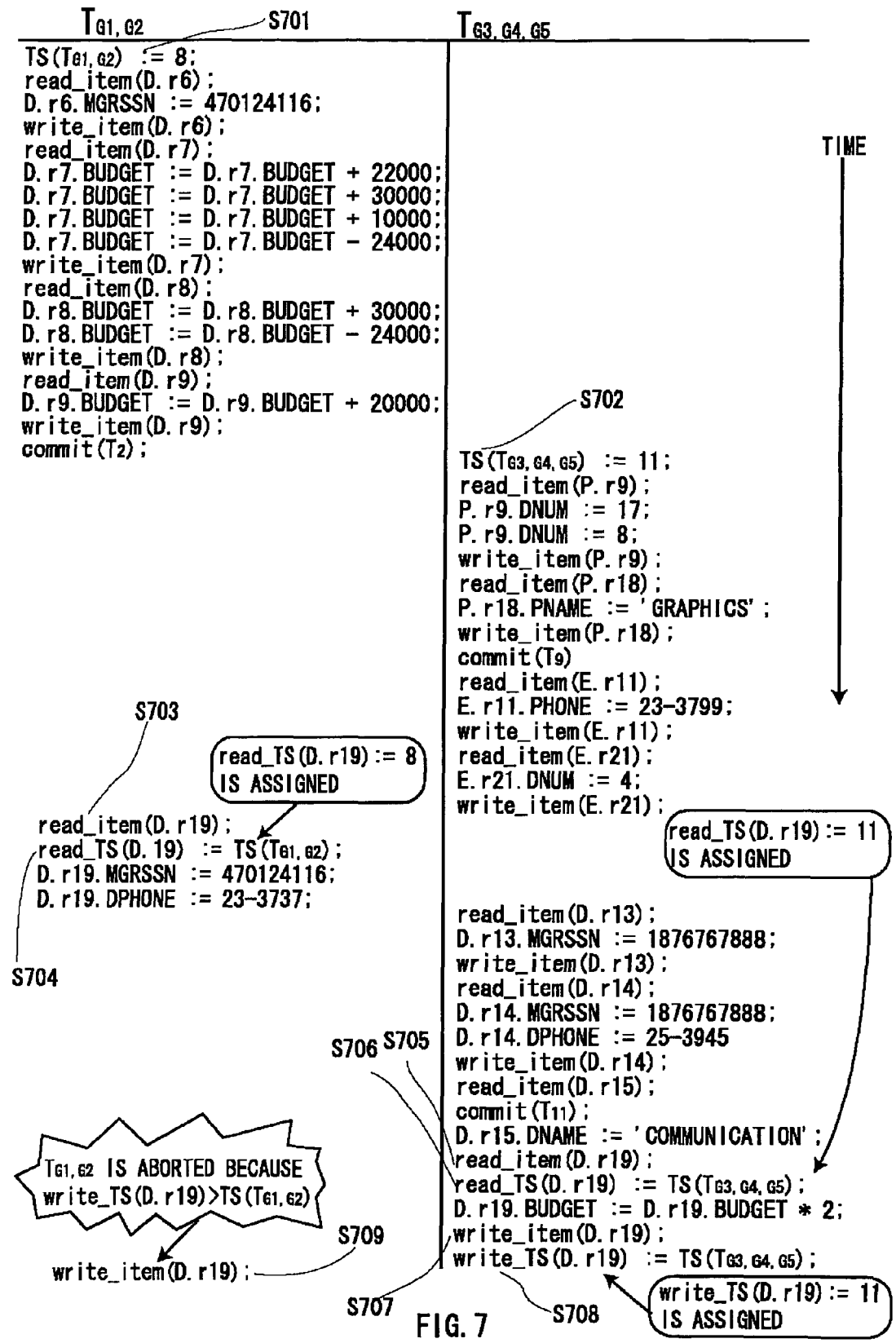
FIG. 7 is a diagram showing an example of multi-operation processing using timestamps.

FIG. 7 shows the concurrent execution of synthetic transactions $T_{G1,G2}$ and $T_{G3,G4,G5}$ by using multi-operation processing using timestamps.

For updating record D.r19, synthetic transaction $T_{G3,G4,G5}$ reads record D.r19 (S705) after which is read by synthetic transaction $T_{G1,G2}$(S703); however, synthetic transaction $T_{G3,G4,G5}$ writes record D.r19 (S707) before synthetic transaction $T_{G1,G2}$ writes it. Therefore, if synthetic transaction $T_{G1,G2}$ subsequently writes record D.r19 (S709), the value of record D.r19 written by synthetic transaction $T_{G3,G4,G5}$ is overwritten, causing synthetic transaction $T_{G1,G2}$ to be aborted. How to find this data inconsistency by using multi-operation processing using timestamps is described as follows.

The timestamp of synthetic transaction $T_{G1,G2}$ is set to 8 (assuming that the largest timestamp among all of the transactions contained in synthetic transaction $T_{G1,G2}$ is the timestamp 8 of transaction $T_8$) (S701).

Also, the timestamp of synthetic transaction $T_{G3,G4,G5}$ is set to 11 (assuming that the largest timestamp among all of the transactions contained in synthetic transaction $T_{G3,G4,G5}$ is the timestamp 11 of transaction $T_{11}$) (S702).

First, when synthetic transaction $T_{G1,G2}$ reads record D.r19, the value of write_TS(D.r19) is 0 (initial value) so that the condition write_TS(D.r19)≦TS($T_{G1,G2}$) of case 2(b) is satisfied. Therefore, read_item(D.r19) is executed (S703) and the value of read_TS(D.r19) is set to 8 (S704).

Next, when synthetic transaction $T_{G3,G4,G5}$ reads record D.r19 (S705), the value of write_TS(D.r19) is 0 (initial value) and the value of TS($T_{G3,G4,G5}$) is 11 so that the condition write_TS(D.r19)≦TS($T_{G3,G4,G5}$) of case 2(b) is satisfied. Therefore, read_item(D.r19) is executed (S705) and the value of read_TS(D.r19) is changed to 11 from 8 (S706).

Next, when synthetic transaction $T_{G3,G4,G5}$ requests a write operation write_item(D.r19) for record D.r19 (S707), whether the condition read_TS(D.r19)>TS($T_{G3,G4,G5}$) or the condition write_TS(D.r19)>TS($T_{G3,G4,G5}$) of case 1(a) is satisfied is checked. Since the value of read_TS(D.r19) is 11, the value of write_TS(D.r19) is 0, and the value of TS($T_{G3,G4,G5}$) is 11, the condition of case 1(a) is not satisfied. Therefore, write_item(D.r19) of case 1(b) is executed (S707) and the value of write_TS(D.r19) is set to 11 (S708).

Next, when synthetic transaction $T_{G1,G2}$ requests a write operation write_item(D.r19) for data item D.r19 (S709), whether the condition read_TS(D.r19)>TS($T_{G1,G2}$) or the condition write_TS(D.r19)>TS($T_{G1,G2}$) of case 1(a) is satisfied is checked. Since the value of read_TS(D.r19) is 11, the value of write_TS(D.r19) is 11, and the value of TS($T_{G1,G2}$) is 8, the condition of case 1(a) is satisfied. As a result, synthetic transaction $T_{G1,G2}$ is aborted.

To abort the synthetic transaction $T_{G1,G2}$, the already committed transaction $T_2$ contained in synthetic transaction $T_{G1,G2}$ is left intact and only the uncommitted transactions $T_7$, $T_3$, $T_1$, $T_5$, $T_8$, $T_4$ and $T_6$ are aborted, rolled back, and resubmitted to the transaction processing system.

In this manner, multiple synthetic transactions are executed by using multi-operation processing using timestamps.

3. Transaction Processing Having Complex and Advanced Queries

How to process multiple transactions having complex and advanced queries such as queries containing join operations is described using a specific example.

The following three transactions $T_{12}$, $T_{13}$ and $T_{14}$ performing their operations for the relation DEPARTMENT (300) of FIG. 3-1 and the relation EMPLOYEE (400) of FIG. 3-2 are submitted to the transaction processing system.

Figure 8:
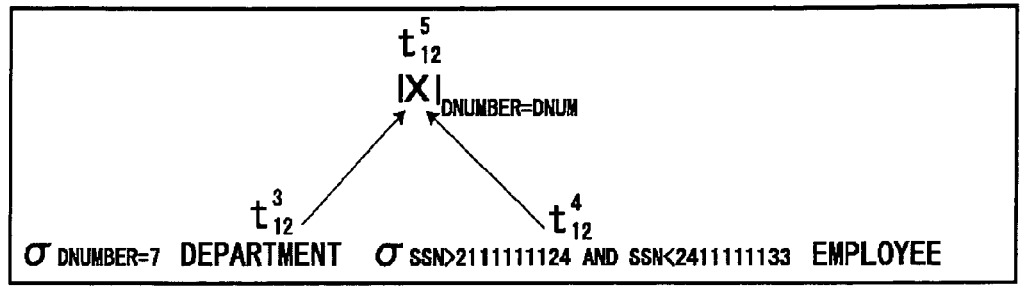
FIG. 8 is a diagram showing query trees and precedence graphs.
Figure 8:
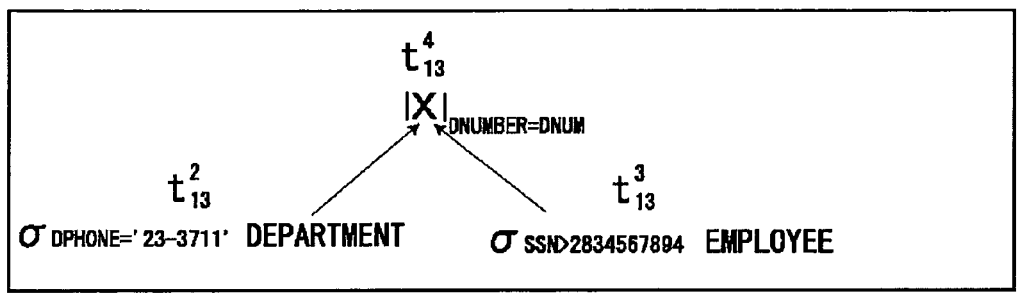
Figure 8:
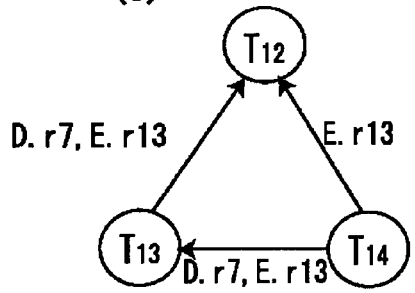
Figure 8:
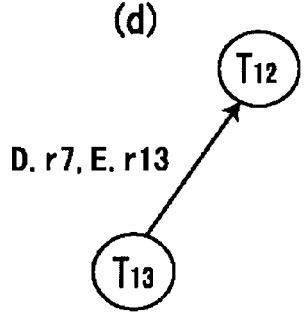
Figure 8:

($T_{12}$):BEGIN WORK;
    Update Operation 1 of $T_{12}$
    UPDATE DEPARTMENT
    SET BUDGET=BUDGET+9000
    WHERE DNUMBER=7;
    Update Operation 2 of $T_{12}$
    UPDATE EMPLOYEE
    SET MGRSSN=470191111
    WHERE SSN>1876767888 AND SSN<2111111124;
    Query 1 of $T_{12}$
    SELECT*
    FROM DEPARTMENT, EMPLOYEE
    WHERE DNUMBER=7 AND SSN>2111111124 AND SSN<2411111133 AND
DNUMBER=DNUM;
COMMIT WORK;
($T_{13}$):BEGIN WORK;
Update Operation 1 of $T_{13}$
UPDATE EMPLOYEE
SET DNUM=8
WHERE SSN=2311111132;
Query 1 of $T_{13}$
SELECT*
FROM DEPARTMENT, EMPLOYEE
WHERE DPHONE='23-3711' AND
SSN>2834567894 AND DNUM=DNUMBER;
Update Operation 2 of $T_{13}$
UPDATE DEPARTMENT
SET DNAME='SHIPPING'
WHERE DNUMBER=7;
COMMIT WORK;
($T_{14}$):BEGIN WORK;
Update Operation 1 of $T_{14}$
UPDATE EMPLOYEE
SET PHONE='23-5600'
WHERE SSN=2311111132;
Update Operation 2 of $T_{14}$
UPDATE DEPARTMENT
SET BUDGET=BUDGET+4000
WHERE DNUMBER>6 AND DNUMBER<9;
COMMIT WORK;

For executing the submitted transactions, query trees need to be created for the queries containing join operations included in the transactions. Since transactions $T_{12}$ and $T_{13}$ each include queries containing join operations, the transaction processing system performs query optimization to create query trees (a), (b) shown in FIG. 8 for these queries. A join operation in these query trees is expressed as a notation |X| and a select operation is expressed as σ.

Once the query trees are created, the transaction processing system obtains partial operations of the transactions $T_{12}$, $T_{13}$ and $T_{14}$ and creates the following tasks.

($T_{12}$):
  ($t_{12}^1$):read_item(D.r7);
  D.r7.BUDGET:=D.r7.BUDGET+9000;
  write_item(D.r7);
  ($t_{12}^2$):read_item(E.r9);
  E.r9.MGRSSN:=470191111;
  write_item(E.r9);
  read_item(E.r10);
  E.r10.MGRSSN:=470191111;
  write_item(E.r10);
  ($t_{12}^3$):read_item(D.r7);
  ($t_{12}^4$):read_item(E.r12);
  read_item(E.r13);
  ($t_{12}^5$):TEMP_T12_3|X|$_{DNUMBER=DNUM}$TEMP_T12_4;
($T_{13}$):
  ($t_{13}^1$):read_item(E.r13);
  E.r13.DNUM=8;
  write_item(E.r13);
  ($t_{13}^2$):read_item(D.r6);
  ($t_{13}^3$):read_item(E.r19);
  read_item(E.r20);
  ($t_{13}^4$):TEMP_T13_2|X|$_{DNUMBER=DNUM}$TEMP_T13_3;
  ($t_{13}^5$):read_item(D.r7);
  D.r7.DNAME:='SHIPPING';
  write_item(D.r7);
($T_{14}$):
  ($t_{14}^1$):read_item(E.r13);
  E.r13.PHONE:='23-5600';
  write_item(E.r13);
  ($t_{14}^2$):read_item(D.r7);
  D.r7.BUDGET:=D.r7.BUDGET+4000;
  write_item(D.r7);
  read_item(D.r8);
  D.r8.BUDGET:=D.r8.BUDGET+4000;
  write_item(D.r8);

Tasks $t_{12}^3$ shown above is a selection operation $\sigma_{DNUMBER=7}$DEPARTMENT within the query tree of FIG. 8(a).

Task $t_{12}^4$ shown above is a selection operation $\sigma_{SSN>2111111124\ AND\ SSN<2411111133}$EMPLOYEE within the query tree of FIG. 8(a).

Task $t_{13}^2$ shown above is a select operation $\sigma_{DPHONE='23-3711'}$DEPARTMENT within the query tree of FIG. 8(b).

Task $t_{13}^3$ shown above is a select operation $\sigma_{SSN>2834567894}$EMPLOYEE within the query tree of FIG. 8(b).

Task $t_{12}^5$ shown above is a partial operation of transaction $T_{12}$ which is expressed as a join operation
TEMP_T12_3|X|$_{DNUMBER=DNUM}$ TEMP_T12_4 in the query tree of FIG. 8(a).

TEMP_T12_3 is a temporary relation to be created when the selection operation of task $t_{12}^3$ is executed.

TEMP_T12_4 is a temporary relation to be created when the selection operation of task $t_{12}^4$ is executed.

The join operation of task $t_{12}^5$ is executed when the temporary relations TEMP_T12_3 and TEMP_T12_4 are created.

Task $t_{13}^4$ shown above is a partial operation of transaction $T_{13}$, which is expressed as a join operation TEMP_T13_2|X|$_{DNUMBER=DNUM}$ TEMP_T13_3 in the query tree of FIG. 8(b).

TEMP_T13_2 is a temporary relation to be created when the selection operation of task $t_{13}^2$ is executed.

TEMP_T13_3 is a temporary relation to be created when the selection operation of task $t_{13}^3$ is executed.

The join operation of task $t_{13}^4$ is executed when the temporary relations TEMP_T13_2 and TEMP_T13_3 are created.

Once the partial operations of the transactions are created, a transaction execution order is determined. In order to determine the transaction execution order, the processing cost of each transaction is obtained based on the partial operations contained in the transaction, and the transactions are sorted in the order from the transaction of smaller processing cost.

When the processing cost of transaction $T_{12}$ is 6, the processing cost of transaction $T_{13}$ is 5, and the processing cost of transaction $T_{14}$ is 2, the transaction execution order may be determined as $T_{14}$, $T_{13}$, $T_{12}$.

Once the transaction execution order is determined, a precedence graph of FIG. 8(c) indicating to update data in the transaction execution order is created.

Since transactions $T_{13}$ and $T_{12}$ perform their operations on the same records D.r7 and E.r13, an edge is drawn from vertex $T_{13}$ to vertex $T_{12}$ according to the transaction execution order.

Since transactions $T_{14}$ and $T_{13}$ perform their operations on the same records D.r7 and E.r13, an edge is drawn from vertex $T_{14}$ to vertex $T_{13}$ according to the transaction execution order.

Since transactions $T_{14}$ and $T_{12}$ perform their operations on the same record E.r13, an edge is drawn from vertex $T_{14}$ to vertex $T_{12}$ according to the transaction execution order.

Once the precedence graph is created, the partial operations contained in the transactions $T_{14}$, $T_{13}$ and $T_{12}$ are retrieved as tasks and divided into groups for each database relation in the transaction execution order, resulting in the following.

| | |
|---|---|
| DEPARTMENT: | Group G6 = $\{t_{14}^2, t_{13}^2, t_{13}^5, t_{12}^1, t_{12}^3\}$ |
| EMPLOYEE: | Group G7 = $\{t_{14}^1, t_{13}^1, t_{13}^3, t_{12}^2, t_{12}^4\}$ |
| TEMP_T13_3: | Group G8 = $\{t_{13}^4\}$ |
| TEMP_T12_4: | Group G9 = $\{t_{12}^5\}$ |

To group the tasks of join operation, the temporary relation to be used as a retrieve source in the join operation is treated as a relation for grouping. Thus, task $t_{13}^4$ using the temporary relation TEMP_T13_3 as a retrieve source in its join operation is collected into group G8, and task $t_{12}^5$ using the temporary relation TEMP_T12_4 as a retrieve source in its join operation is collected into group G9.

Once the tasks are grouped and groups G6, G7, G8 and G9 are created, synthetic transaction $T_{G6,G7,G8,G9}$ is created using the groups G6, G7, G8 and G9. Then, each group contained in the synthetic transaction $T_{G6,G7,G8,G9}$ is executed using multi-operation processing described in Section 1.

For executing the groups, the join operation of task $t_{13}^4$ in group G8 is executed after finishing the execution of the select operation of tasks $t_{13}^2$ in group G6 and the select operation of task $t_{13}^3$ in group G7.

Similarly, the join operation of task $t_{12}^5$ in group G9 is executed after finishing the executions of the select operation of tasks $t_{12}^3$ in group G6 and the select operation of task $t_{12}^4$ in group G7.

First, when the executions of groups G6 and G7 are completed, the execution of all of the tasks in transaction $T_{14}$ is finished; therefore, transaction $T_{14}$ is ended and committed.

Once transaction $T_{14}$ is committed, vertex $T_{14}$ and all of the outgoing edges from vertex $T_{14}$ are removed from the precedence graph of FIG. 8(c). The result of this operation is shown in the precedence graph of FIG. 8(d).

Next, once the execution of the join operation of task $t_{13}^4$ in group G8 is finished, the execution of all of the tasks in transaction $T_{13}$ is finished; therefore, transaction $T_{13}$ is ended and committed.

Once transaction $T_{13}$ is committed, vertex $T_{13}$ and all of the outgoing edges from the vertex are removed from the precedence graph of FIG. 8(d). The result of this operation is shown in the precedence graph of FIG. 8(e).

Lastly, once the execution of the join operation of task $t_{12}^5$ in group G9 is finished, the execution of all of the tasks in transaction $T_{12}$ is finished; therefore, transaction $T_{12}$ is ended and committed. As a result, the execution of synthetic transaction $T_{G6,G7,G8,G9}$ is completed; therefore, all of the submitted transactions $T_{12}$, $T_{13}$ and $T_{14}$ were executed and committed.

As described above, multi-operation processing providing concurrency control of transactions according to the present invention is able to handle transactions having complex and advanced queries.

4. Experiment Results

In this section, an experiment evaluating the transaction processing of multi-operation processing providing concurrency control of transactions and results thereof have been examined. In this experiment, the transaction processing time of the multi-operation processing providing concurrency control of transactions according to the present invention described in Section 1 and the transaction processing time of the conventional two-phase locking protocol that executes each transaction separately were measured, and then processing time of these methods were compared.

According to the steps described in Section 1.1, the multi-operation processing providing concurrency control of transactions executes each synthetic transaction serially by creating a synthetic transaction for multiple transactions submitted to the transaction processing system, executing the synthetic transaction, creating another synthetic transaction using the same procedure if a large number of new transactions is submitted once the execution of a single synthetic transaction is finished, and executing that another synthetic transaction.

Moreover, the multiple groups contained in a synthetic transaction are executed concurrently using multiple processes of the operating system.

A personal computer (a Celeron CPU 1.73 GHz processor, 1 GB main memory, a 145 GB disk) running Windows XP professional (registered trademark) as a database server was used to conduct this experiment. Our originally designed database management system software MOP-DB was installed on the database server, a database consisting of 6 relations was created using this software, and indices such as primary index and secondary index were added to each relation.

The MOP-DB software was designed to be capable for performing both the transaction processing of the multi-operation processing providing concurrency control of transactions according to the present invention and the transaction processing of the conventional two-phase locking protocol.

Next, our original client program was created, a large number of transactions written in SQL were submitted to the database server from the client program, and the time until all of the transactions are executed and committed by the database server was measured to obtain the transaction processing time of each method.

<Experiment 1: Number of Transactions and Processing Time>

One million records were stored in each relation, thus a total of six million records were added to six relations. The processing time for each method is shown in the table of FIG. 9(a) and the graph of FIG. 9(b) when the number of transactions to be sent to the database server is varied from 1000 to 10000 transactions respectively.

Considering that transaction processing time of each transaction to become shorter is the same as transaction processing speed to become faster, the transaction processing speed of multi-operation processing providing concurrency control of transactions is observed in general to be faster than the transaction processing speed of the conventional two-phase locking protocol for executing the number of transactions from 1000 to 10000 transactions.

Figure 9:
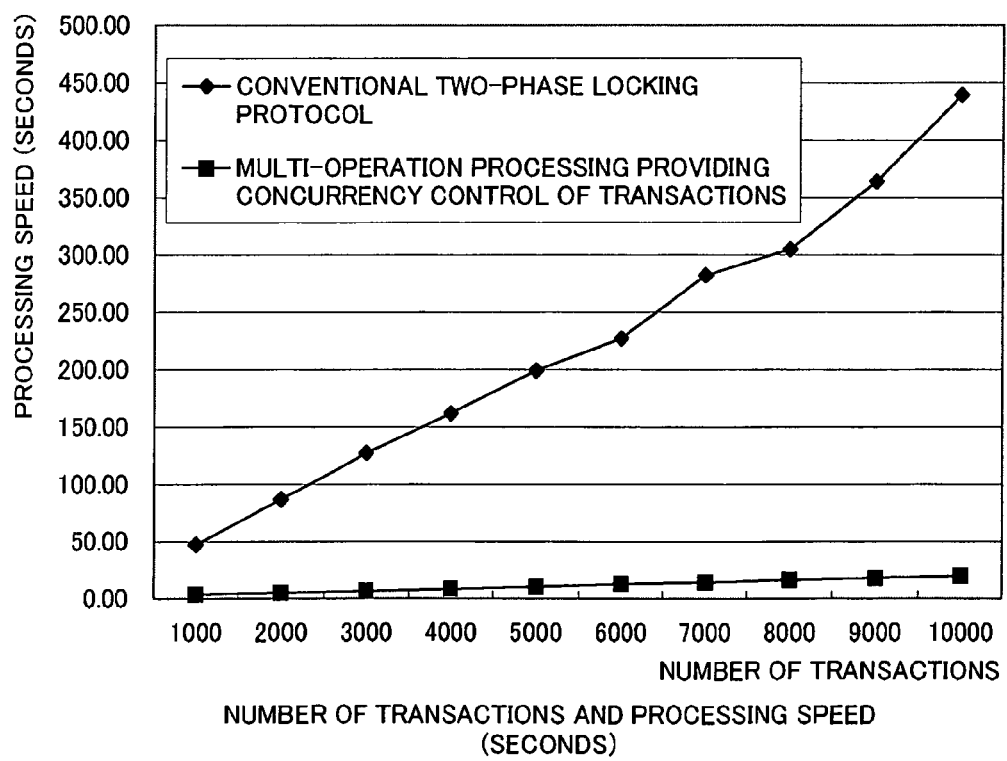
FIG. 9 shows a table (a) and a graph (b) of experiment results evaluating multi-operation processing providing concurrency control of transactions.

As shown in the table of FIG. 9(a), the transaction processing speed of multi-operation processing providing concurrency control of transactions obtained the transaction processing speed which is 18.36 times faster on average than the conventional two-phase locking protocol for executing the number of transactions from 1000 to 5000 transactions, and 19.98 times faster on average than the conventional two-phase locking protocol for executing the number of transactions from 6000 to 10000 transactions.

The transaction processing speed of multi-operation processing providing concurrency control of transactions tends to improve as the number of transactions increases.

As shown in the graph of FIG. 9(b), the transaction processing speed of the conventional two-phase locking protocol decreased as the number of transactions increased, because many transactions read the same data item many times repeatedly, performed their update operations on the same data item separately, and wrote their updated results in the database many times repeatedly.

On the other hand, the transaction processing speed of multi-operation processing providing concurrency control of transactions improved as the number of transactions to be executed concurrently increased, because the same data item to be processed by multiple transactions is read only once, the update operations of the multiple transactions are executed consecutively on the same data item in the main memory, and only the last updated result is written in the database once.

<Experiment 2: Database Size and Processing Time>

Figure 10:
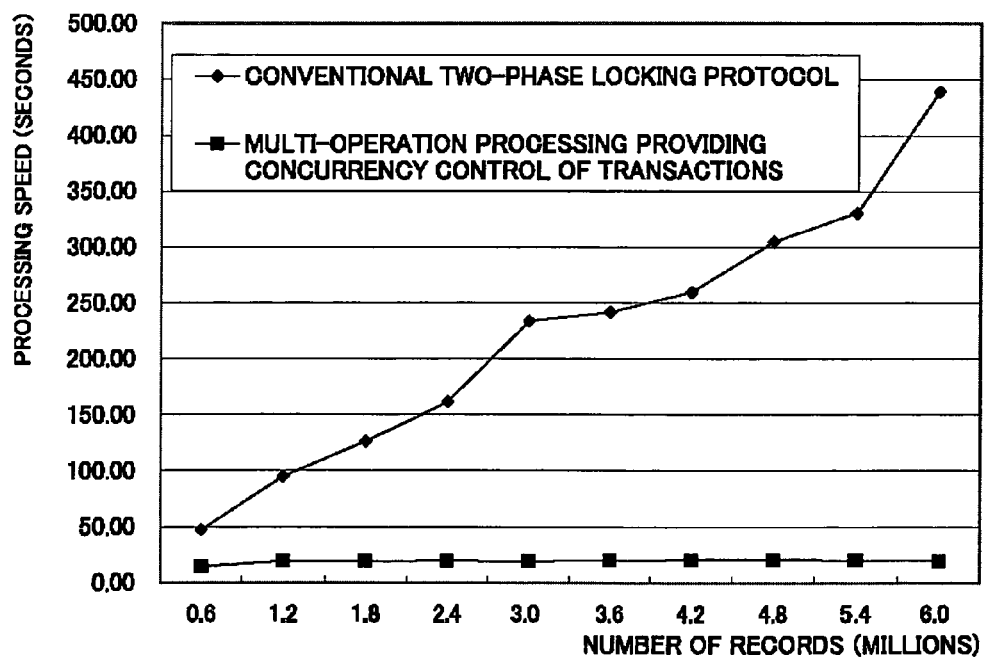
FIG. 10 shows a table (a) and a graph (b) of experiment results evaluating multi-operation processing providing concurrency control of transactions.

The table of FIG. 10(a) and the graph of FIG. 10(b) show the processing time of requesting 10000 transactions for the database of different size having the number of records stored in 6 relations is varied from 0.6 million to 6 million records respectively.

As shown in the table of FIG. 10(a) and the graph of FIG. 10(b), multi-operation processing providing concurrency control of transactions obtained the transaction processing speed which is 8.04 times faster on average than the conventional two-phase locking protocol for the number of records from 0.6 million to 3 million records, and 15.59 times faster on average than the conventional two-phase locking protocol for the number of records from 3.6 million to 6 million records. Thus, the transaction processing speed tends to improve as the database size increases.

The conventional two-phase locking protocol took longer to execute each transaction as the database size increased. On the other hand, multi-operation processing providing concurrency control of transactions was able to execute each synthetic transaction efficiently without being affected by database size.

5. Conclusion

For processing multiple transactions submitted to the transaction processing system, multi-operation processing providing concurrency control of transactions has been proposed to solve the conventional problems caused by executing each transaction separately.

If a large number of transactions is submitted to the transaction processing system, this system of the present invention obtains partial operations of the submitted transactions, determines a transaction execution order, creates a precedence graph indicating to update data in the determined transaction execution order, retrieves the partial operations contained in the transactions as tasks, divides the retrieved tasks into groups for each database relation in the transaction execution order, creates a synthetic transaction using the groups created by grouping, and executes each group contained in the synthetic transaction using multi-operation processing.

The multi-operation processing determines an access order for blocks in the lined up order of the tasks in the group, reads a block in the determined access order, extracts the tasks accessing the read block from the group, and executes the task operations consecutively on a data item in the block in the lined up order of the tasks in the group.

Consecutive execution of the task operations on a data item in the block in the lined up order of the tasks in the group means to consecutively execute the task operations, which are partial operations of the transactions, on the data item according to the transaction execution order indicated in the precedence graph when the data item in the block exists in the precedence graph, that is, when the multiple tasks perform their update operations on the data item, the update operation of the first task is executed on the data item, the update operation of the next task is executed on the updated data item, such update operation is repeated in this manner, and only the last updated result is written in the database once after the update operation of the last task is executed.

By using this system to execute multiple submitted transactions, unlike the conventional transaction processing, retrieving the same data item many times repeatedly, executing an update operation on the retrieved data item separately, and writing the updated result in the database many times repeatedly are no longer required for each transaction.

The system of the present invention allows more efficient execution of a large number of transactions, because the data item to be processed by multiple transaction is retrieved only once, the update operations of the multiple transactions are executed consecutively on the retrieved data item in the main memory, and only the last updated result is written in the database once.

Since the present invention creates a precedence graph not containing any cycle for multiple submitted transactions, and for the data item to be processed by the multiple transactions, the update operations of the multiple transactions are executed consecutively on the data item according to the transaction execution order indicated in the precedence graph, these multiple submitted transactions are guaranteed to be executed in a serializable schedule.

Since each group contained in a synthetic transaction is executed for a different relation, even if the multiple groups contained in the synthetic transaction are executed concurrently, the same data item is not accessed simultaneously by the multiple groups.

Since the operations of the tasks collected into a group are executed consecutively on a data item in the block, which is read into the main memory, according to the transaction execution order indicated in the precedence graph, acquiring locks between multiple submitted transactions, making transactions wait, and aborting transactions are no longer required.

The present invention creates a single synthetic transaction for multiple submitted transactions and executes the synthetic transaction; once the single synthetic transaction is executed, if new multiple transactions are submitted, the present invention creates another synthetic transaction for these transactions and executes that synthetic transaction. Therefore, as long as synthetic transactions are executed serially, no locks are required. Moreover, deadlocks do not occur, and the multiple groups contained in a synthetic transaction are executed concurrently.

While the transaction processing speed may be improved significantly by executing synthetic transactions serially, the multi-operation processing using two-phase locking and the multi-operation processing using timestamps have been proposed to execute multiple synthetic transactions concurrently so as to efficiently utilize hardware resources such as CPU and disk.

What is claimed is:

1. A database transaction processing system using multi-operation processing providing concurrency control of transactions, said transaction processing system comprising:
    a processor;
    transaction execution order determination means for determining a transaction execution order for a plurality of submitted transactions;
    precedence graph creating means for creating a precedence graph indicating to update data in the determined transaction execution order when a plurality of transactions performs its operation on the same data item by creating an edge for the data item and drawing it from the vertex of the first transaction to perform its operation to vertex of the next transaction to perform its operation;

task retrieval means for retrieving partial operations contained in the plurality of transactions as tasks;

grouping means for grouping the retrieved tasks into groups for each access area of the database in the transaction execution order;

synthetic transaction creating means for creating a synthetic transaction using the groups created by grouping; and multi-operation processing means for executing each group contained in the synthetic transaction using multi-operation processing, wherein the multi-operation processing means finds blocks in the access area to be accessed by the grouped tasks, determines an access order for the blocks in the lined up order of the tasks in the group, reads a block in the determined access order, extracts tasks accessing the read block from the group, executes the task operations consecutively on a data item in the block in the lined up order of the tasks in the group, determines whether an ended transaction can be committed based on whether an incoming edge to the vertex of the ended transaction in the precedence graph exists at this time when execution of a grouped task is finished and the transaction containing the finished task is ended, commits the transaction if the vertex of the ended transaction does not have any incoming edges, and removes the vertex of the transaction and all of the outgoing edges from the vertex;

a process of executing the task operations consecutively on a data item in the block in the lined up order of the tasks in the grouping means executing the task operations, which are partial operations of the transactions, consecutively on the data item according to the transaction execution order indicated in the precedence graph when the data item in the block exists in the precedence graph, when the plurality of tasks performs its update operation on the data item, the update operation of the first task is executed on the data item, the update operation of the next task is executed on the updated data item, such update operation is repeated in this manner, and only the last updated result is written in the database once after the update operation of the last task is executed.

2. The database transaction processing system according to claim 1, wherein two-phase locking protocol or timestamp protocol is used to execute a plurality of synthetic transactions concurrently.

3. A program stored in a tangible non-transitory computer-readable storage medium, the program corresponding to respective functions of the database transaction processing system of database using multi-operation processing providing concurrency control of transactions according to claim 1 or 2; said program is executed by a computer system.

4. A tangible non-transitory computer readable storage medium stored with a program corresponding to respective functions of the database transaction processing system of database using multi-operation processing providing concurrency control of transactions according to claim 1 or 2; said program is executed by a computer system.

* * * * *